US012752797B2

(12) United States Patent
Lee et al.

(10) Patent No.: US 12,752,797 B2
(45) Date of Patent: Oct. 6, 2026

(54) ELECTRONIC APPARATUS FOR CONTROLLING FUNCTION OF VEHICLE, AND METHOD THEREBY

(71) Applicant: Samsung Electronics Co., Ltd., Gyeonggi-do (KR)

(72) Inventors: Jaewoong Lee, Gyeonggi-do (KR); Hyunggon Kim, Gyeonggi-do (KR); Woong Lee, Gyeonggi-do (KR); Yuseon Lee, Gyeonggi-do (KR); Changwon Jang, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 136 days.

(21) Appl. No.: 17/684,738

(22) Filed: Mar. 2, 2022

(65) Prior Publication Data

US 2022/0281465 A1 Sep. 8, 2022

Related U.S. Application Data

(63) Continuation of application No. PCT/KR2022/002796, filed on Feb. 25, 2022.

(30) Foreign Application Priority Data

Mar. 2, 2021 (KR) ........................ 10-2021-0027429

(51) Int. Cl.
*B60W 50/00* (2006.01)
*B60W 40/105* (2012.01)
(Continued)

(52) U.S. Cl.
CPC ...... *B60W 50/0098* (2013.01); *B60W 40/105* (2013.01); *B60W 60/001* (2020.02); *G01C 21/3605* (2013.01); *G07C 5/008* (2013.01)

(58) Field of Classification Search
CPC ........... B60W 50/0098; B60W 40/105; B60W 60/001; B60W 50/00; B60W 50/14;
(Continued)

(56) References Cited

U.S. PATENT DOCUMENTS

| | | | | |
|---|---|---|---|---|
| 9,992,252 | B2 * | 6/2018 | Smith | H04N 19/176 |
| 10,468,062 | B1 | 11/2019 | Levinson et al. | |

(Continued)

FOREIGN PATENT DOCUMENTS

| | | | |
|---|---|---|---|
| CN | 108390921 | A | 8/2018 |
| CN | 108564681 | A | 9/2018 |

(Continued)

OTHER PUBLICATIONS

International Search Report dated May 30, 2022.
(Continued)

*Primary Examiner* — Christian Chace
*Assistant Examiner* — Nicholas Stryker
(74) *Attorney, Agent, or Firm* — CANTOR COLBURN LLP

(57) ABSTRACT

An electronic apparatus is disclosed, including a memory, communication circuitry, and a processor. The processor implements the method, including: identifying a state of the communication connection with the external server, based on the identified state, determining a target size for data to be transmitted to the external server, controlling at least one sensor of the vehicle to collect the data such that a total size of the collected data is less than or equal to the determined target size, transmitting the data collected by the at least one sensor to the external server, and receiving a control command from the external server based on the transmitted data, and control a function of the vehicle according to the received control command.

13 Claims, 20 Drawing Sheets

(51) Int. Cl.

| | |
|---|---|
| ***B60W 60/00*** | (2020.01) |
| ***G01C 21/36*** | (2006.01) |
| ***G07C 5/00*** | (2006.01) |

(58) Field of Classification Search

CPC ............. B60W 60/00; B60W 60/0015; B60W 2050/0005; B60W 2420/00; B60W 2520/06; B60W 2554/4041; B60W 2554/4042; B60W 2556/45; G01C 21/3605; G01C 21/00; G01C 21/34; G07C 5/008; G07C 5/00; G05D 1/0055; G05D 1/0088; G05D 1/0212; G05D 1/00; G05D 1/02

See application file for complete search history.

(56) References Cited

U.S. PATENT DOCUMENTS

| | | | | |
|---|---|---|---|---|
| 10,701,532 | B2 | 6/2020 | Jung et al. | |
| 10,719,084 | B2 | 7/2020 | Yoon et al. | |
| 10,771,787 | B2 | 9/2020 | Brugman | |
| 11,828,604 | B2 | 11/2023 | Wang et al. | |
| 12,197,209 | B2 | 1/2025 | Altman | |
| 2016/0025505 | A1* | 1/2016 | Oh | G01C 21/3461 701/23 |
| 2018/0095457 | A1 | 4/2018 | Lee et al. | |
| 2019/0079540 | A1 | 3/2019 | Yoon et al. | |
| 2019/0261223 | A1* | 8/2019 | Miyamoto | H04L 7/0037 |
| 2019/0320328 | A1* | 10/2019 | Magzimof | H04W 16/22 |
| 2019/0322288 | A1* | 10/2019 | Hansel | G05D 1/0217 |
| 2019/0377341 | A1* | 12/2019 | Choi | B60R 16/0231 |
| 2020/0033845 | A1* | 1/2020 | Park | H04W 4/40 |
| 2020/0041994 | A1* | 2/2020 | Alalao | H04W 4/40 |
| 2020/0130679 | A1* | 4/2020 | Salles | H04L 12/40156 |
| 2020/0201315 | A1* | 6/2020 | Gogna | G05D 1/0088 |
| 2020/0202167 | A1* | 6/2020 | Gross | G06V 10/82 |
| 2020/0309533 | A1* | 10/2020 | Young | G06V 10/993 |
| 2021/0042534 | A1* | 2/2021 | Hayashida | G06T 7/207 |
| 2021/0107488 | A1 | 4/2021 | Jeong | |
| 2021/0109515 | A1* | 4/2021 | Urano | G05D 1/0027 |
| 2021/0116907 | A1* | 4/2021 | Altman | B60W 60/0015 |
| 2021/0183332 | A1* | 6/2021 | Myles | H04L 65/612 |
| 2021/0276544 | A1* | 9/2021 | Park | B60W 40/02 |

FOREIGN PATENT DOCUMENTS

| | | | | | |
|---|---|---|---|---|---|
| CN | 111263293 | A | | 6/2020 | |
| CN | 111833717 | A | | 10/2020 | |
| CN | 112074790 | A | | 12/2020 | |
| CN | 112166304 | A | | 1/2021 | |
| JP | 2009-212937 | A | | 9/2009 | |
| JP | 2011039245 | A | * | 2/2011 | G01C 21/00 |
| JP | 2021-28789 | A | | 2/2021 | |
| KR | 10-2016-0013713 | A | | 2/2016 | |
| KR | 10-2019-0140496 | | * | 5/2018 | B60W 50/14 |
| KR | 10-1891599 | B1 | | 8/2018 | |
| KR | 10-1916435 | B1 | | 11/2018 | |
| KR | 10-1930160 | B1 | | 12/2018 | |
| KR | 10-2019-0134862 | A | | 12/2019 | |
| KR | 10-2019-0140496 | A | | 12/2019 | |
| KR | 10-2020-0132952 | A | | 11/2020 | |
| WO | 2019/180700 | A1 | | 9/2019 | |

OTHER PUBLICATIONS

Extended European Search Report dated May 27, 2024.

XP051680461, “3rd Generation Partnership Project; Technical Specification Group Services and System Aspects; Enhancement of 3GPP Support for V2X Scenarios; Stage 1 (Release 15)”.

Chinese Office Action for CN Application No. 202280018605.6 mailed on Mar. 21, 2026.

European Office Action for EP Application No. 22 763 538.0 mailed on Mar. 26, 2026.

Korean Office Action for KR Application No. 10-2021-027429 mailed on Jan. 28, 2026.

* cited by examiner

FIG. 5

| SPEED | POSITION | CANDIDATE THRESHOLD TIME |
|---|---|---|
| ~ 30km/h | SECTION OF RISK LEVEL 1 | 1s |
| | SECTION OF RISK LEVEL 2 | 0.8s |
| | SECTION OF RISK LEVEL 3 | 0.6s |
| 31 ~ 60km/h | SECTION OF RISK LEVEL 1 | 0.8s |
| | SECTION OF RISK LEVEL 2 | 0.6s |
| | SECTION OF RISK LEVEL 3 | 0.4s |
| 61 ~ 90km/h | SECTION OF RISK LEVEL 1 | 0.6s |
| | SECTION OF RISK LEVEL 2 | 0.4s |
| | SECTION OF RISK LEVEL 3 | 0.2s |
| 91km/h ~ | SECTION OF RISK LEVEL 1 | 0.4s |
| | SECTION OF RISK LEVEL 2 | 0.2s |
| | SECTION OF RISK LEVEL 3 | 0.1s |

FIG. 6

| TARGET SIZE | THRESHOLD TIME | STABILITY LEVEL |
|---|---|---|
| ~10Mb | 0.1s~0.4s | 2 |
| | 0.5s~0.8s | 1 |
| | 0.9s~1s | 1 |
| 11Mb ~ 50Mb | 0.1s~0.4s | 2 |
| | 0.5s~0.8s | 2 |
| | 0.9s~1s | 1 |
| 51Mb ~ 100Mb | 0.1s~0.4s | 3 |
| | 0.5s~0.8s | 2 |
| | 0.9s~1s | 2 |
| 101Mb ~ | 0.1s~0.4s | 3 |
| | 0.5s~0.8s | 3 |
| | 0.9s~1s | 2 |

FIG. 8

| ROUTE | SECTION | PREDICTED STABILITY LEVEL | DRIVING TIME | AVERAGE OF PREDICTED STABILITY LEVEL |
|---|---|---|---|---|
| A | a−1 | 3 | 40 MINUTES | 2.1 |
| | a−2 | 1 | 30 MINUTES | |
| | a−3 | 2 | 30 MINUTES | |
| B | b−1 | 2 | 50 MINUTES | 2.3 |
| | b−2 | 3 | 30 MINUTES | |
| | b−3 | 2 | 20 MINUTES | |

FIG. 9

| COMMUNICATION METHOD | STABILITY LEVEL | TARGET SIZE |
| --- | --- | --- |
| 5g mmWAVE | 3 | 100Mb |
| 5g SUB6 | 2 | 50Mb |
| LTE | 1 | 20Mb |
| ⋮ | | |

FIG. 10

| MOVEMENT DIRECTION | SENSOR | OPERATION |
| --- | --- | --- |
| FORWARD | FRONT CAMERA | On |
| | REAR CAMERA | Off |
| | FRONT LIDAR | On |
| | REAR LIDAR | Off |
| | SIDE LIDAR | Off |
| | GPS | On |
| | ACCELERATION SENSOR | On |
| | GYRO SENSOR | Off |

FIG. 11

| MOVEMENT DIRECTION | SENSOR | OPERATION |
|---|---|---|
| RIGHT TURN | FRONT CAMERA | On |
| | REAR CAMERA | Off |
| | FRONT LIDAR | On |
| | REAR LIDAR | Off |
| | SIDE LIDAR | On |
| | GPS | On |
| | ACCELERATION SENSOR | On |
| | GYRO SENSOR | On |

FIG. 13

| MOVEMENT DIRECTION | SENSOR | SELECTION STATUS |
|---|---|---|
| FORWARD | FRONT CAMERA | SELECTED |
| | REAR CAMERA | NONSELECTED |
| | FRONT LIDAR | SELECTED |
| | REAR LIDAR | NONSELECTED |
| | SIDE LIDAR | NONSELECTED |
| | GPS | SELECTED |
| | ACCELERATION SENSOR | SELECTED |
| | GYRO SENSOR | NONSELECTED |

FIG. 14

| MOVEMENT DIRECTION | SENSOR | SELECTION STATUS |
| --- | --- | --- |
| RIGHT TURN | FRONT CAMERA | SELECTED |
| | REAR CAMERA | NONSELECTED |
| | FRONT LIDAR | SELECTED |
| | REAR LIDAR | NONSELECTED |
| | SIDE LIDAR | SELECTED |
| | GPS | SELECTED |
| | ACCELERATION SENSOR | SELECTED |
| | GYRO SENSOR | SELECTED |

ELECTRONIC APPARATUS FOR CONTROLLING FUNCTION OF VEHICLE, AND METHOD THEREBY

CROSS-REFERENCE TO RELATED APPLICATION(S)

This application is a Continuation of and claims priority under 35 U.S.C. § 120 to PCT International Application No. PCT/KR2022/002796, which was filed on Feb. 25, 2022, and claims priority to Korean Patent Application No. 10-2021-0027429, filed on Mar. 2, 2021, in the Korean Intellectual Property Office, the disclosures of which are incorporated by reference herein their entirety.

BACKGROUND

Technical Field

This disclosure relates to vehicular electronic devices, and more particular, to control of vehicular functions for autonomous driving by an electronic device and server.

Description of Related Art

In recent times, much attention has been centered on autonomous vehicles and their operation. Autonomous vehicles, such as self-driving cars, are capable of navigating roadways using sensor inputs, electronic control of vehicle functions and sophisticated processing systems. Accordingly, autonomous operation typically utilizes a significant quantity of data processing. Operations may thus involve processing from computer devices installed in the vehicle and/or external servers.

When a server is utilized to process autonomous data, and the communication link between the vehicle and server is unstable, the server may not be able to receive and process the data properly. Further, there may be delays in transmitting crucial instructions to the vehicle.

Thus, a need exists to ensure stable and powerful communication connection between a vehicle and a server for vehicular control, communication, data transmission/reception and/or data processing.

SUMMARY

The present disclosure enables increased safety and security to vehicular control for an autonomous driving system, involving a communication connection between the vehicle and an external server.

Further, the present disclosure improves the vehicle's ability to automatically respond rapidly to changing contextual and environment conditions, even when the communication connection with the server is disrupted or diminished.

The present disclosure improves provision of stable autonomous driving according to a state of communication between the vehicle and the server, which may help the driver adapt to changing and unexpected situations that may occur during autonomous operation of the vehicle.

According to an embodiment of the disclosure, an electronic apparatus is disclosed. The electronic apparatus is installed in a vehicle to control a function of the vehicle, the electronic apparatus includes: a memory storing at least one instruction, communication circuitry that is communicably connected with an external server via a communication connection, and a processor operably coupled to the memory, wherein the at least one instruction is executable by the processor to cause the electronic apparatus to: identify a state of the communication linkage with the external server, based on the identified state, determine a target size for data to be transmitted to the external server, control at least one sensor of the vehicle to collect the data such that a total size of the collected data is less than or equal to the determined target size, transmit the data collected by the at least one sensor to the external server, and receive a control command from the external server based on the transmitted data, and control a function of the vehicle according to the received control command.

According to an embodiment of the disclosure, a method is disclosed. The method is for an electronic apparatus installed in a vehicle, and includes: identifying a state of a communication linkage with an external server, based on the identified state, determining a target size for data to be transmitted to the external server, controlling at least one sensor of the vehicle to collect the data such that a total size of the collected data is less than or equal to the determined target size, transmitting the data collected by the at least one sensor to the external server, and receiving a control command from the external server based on the transmitted data, and controlling a function of the vehicle according to the received control command.

According to an embodiment of the disclosure, an electronic apparatus is disclosed. The electronic apparatus includes: a memory storing at least one instruction, and a processor operably coupled to the memory, wherein at least one instruction is executable by the processor to cause the electronic apparatus to: identify a state of a communication linkage with a server, based on the identified state, determine a target size for data to be transmitted to the external server, select, from previously obtained data, a sub-portion of the previously obtained data having a total size less than or equal to the determined target size for transmission to the external server, transmit the selected sub-portion to the external server, and receive a control command from the external server based on the transmitted data, and control a function of the vehicle according to the received control command.

In certain embodiments of the disclosure, an autonomous driving system is disclosed which enables safe control of a vehicle, in a context in which the vehicle and an external server are communicably linked to each other.

Also, in certain embodiments of the disclosure, an autonomous vehicle may react with rapidity to unexpected and changing external factors, even when communication with the server is diminished or disrupted.

Also, in certain embodiments of the disclosure, autonomous driving may be more stably implemented, according to the state of communication between a vehicle and a server, improving the ability of the driver to adapt to situations that may occur during autonomous operations.

However, effects that may be achieved by an electronic apparatus for controlling a function of a vehicle and a method performed by the electronic apparatus according to an embodiment of the disclosure are not limited to those mentioned above, and other effects not mentioned above may be clearly understood by those of ordinary skill in the art from the following description.

BRIEF DESCRIPTION OF DRAWINGS

Brief descriptions about respective drawings are provided to gain a sufficient understanding of the drawings of the present specification.

FIG. 5 is a diagram for describing a method of selecting a threshold time used to determine a target size, according to an embodiment of the disclosure.

FIG. 6 is a diagram illustrating the stability level of autonomous driving corresponding to a target size and a threshold time, according to an embodiment of the disclosure.

FIG. 8 is a diagram for describing a method of selecting a recommended route from among various routes between a departure point and an arrival point according to the predicted stability level of autonomous driving, according to an embodiment of the disclosure.

FIG. 9 is a diagram for describing a method of determining a target size according to a method of communication between a vehicle and a server, according to an embodiment of the disclosure.

FIG. 10 is a diagram for describing a method of selecting a sensor to be turned off from among sensors installed in a vehicle, by considering a movement direction of the vehicle, according to an embodiment of the disclosure.

FIG. 11 is a diagram for describing a method of selecting a sensor to be turned off from among sensors installed in a vehicle, by considering a movement direction of the vehicle, according to an embodiment of the disclosure.

FIG. 13 is a diagram for describing a method of selecting environment data to be transmitted to a server from among environment data collected by sensors, by considering a movement direction of a vehicle, according to another embodiment of the disclosure.

FIG. 14 is a diagram for describing a method of selecting environment data to be transmitted to a server from among environment data collected by sensors, by considering a movement direction of a vehicle, according to another embodiment of the disclosure.

DETAILED DESCRIPTION

Figure 1:
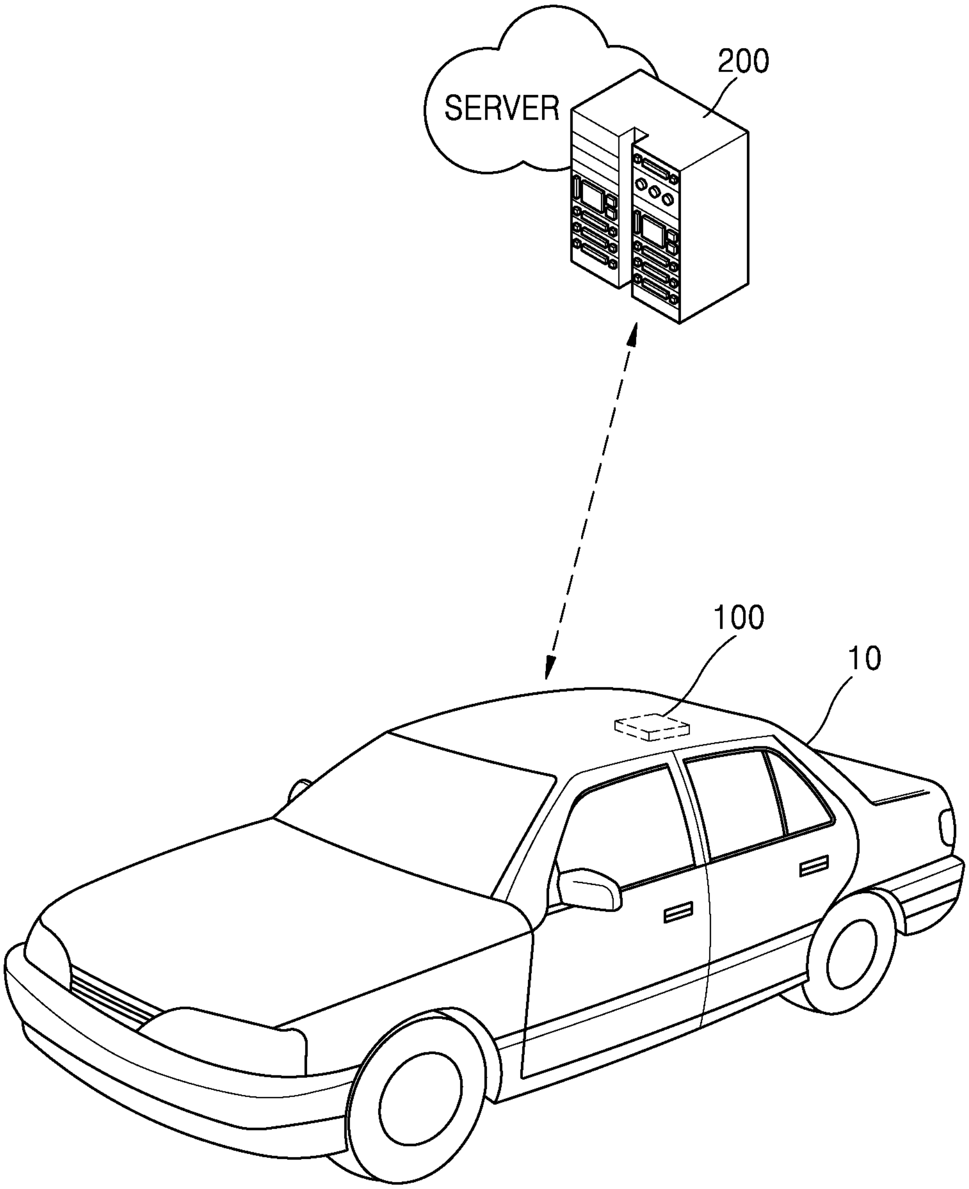
FIG. 1 is a diagram illustrating an electronic apparatus installed in a vehicle, and a server, according to an embodiment of the disclosure.

According to an embodiment of the disclosure, an electronic apparatus is disclosed. The apparatus may be installed in a vehicle to control a function of the vehicle. The apparatus may include: a memory storing at least one instruction; and a processor configured to execute the at least one instruction, causing the apparatus to: identify a state of communication with a server, determine a target size corresponding to data to be transmitted to the server, based on the identified communication state, control at least one sensor installed in the vehicle such that the at least one sensor collects data with a total size less than or equal to the determined target size, transmit the data collected by the at least one sensor to the server, and control a function of the vehicle according to a control command received from the server, in response to transmission of the data.

The processor may be further configured to turn off some of the at least one sensor such that data with a total size less than or equal to the determined target size may be collected.

The processor may be further configured to select a sensor to be turned off from among the at least one sensor, based on at least one of a movement direction of the vehicle or a position of the vehicle.

The processor may be further configured to reduce a sensing capability of the at least one sensor such that data with a total size less than or equal to the determined target size may be collected.

The processor may be further configured to determine the target size such that an expected time from a time point of starting collection of the data to a time point of execution of the control command may be less than or equal to a threshold time.

The processor may be further configured to determine an analysis accuracy for allowing the expected time to be less than or equal to the threshold time and transmit the determined analysis accuracy to the server, in which the control command may be generated by analyzing the data with the determined analysis accuracy.

The processor may be further configured to select the threshold time from among a plurality of candidate threshold times according to at least one of a speed of the vehicle or a position of the vehicle.

The processor be further configured to may output a stability level of autonomous driving corresponding to the determined target size and the threshold time through an in-vehicle output device.

The processor may be further configured to output, through an output device, predicted stability levels of autonomous driving in sections within a route between a departure position and an arrival position of the vehicle.

The processor may be further configured to select a recommended route from among routes between a departure position and an arrival position of the vehicle by considering averages of predicted stability levels of the routes.

The processor may be further configured to determine a target size corresponding to data to be transmitted to the server, according to a stability level of autonomous driving corresponding to a method of communication with the server.

The processor may be further configured to select some data with a total size less than or equal to the determined target size, when there is data pre-obtained from the at least one sensor, and transmit the selected some data to the server.

According to another embodiment of the disclosure, a method performed by an electronic apparatus to be installed in a vehicle includes: identifying a state of communication with a server; determining a target size corresponding to data to be transmitted to the server according to the identified communication state; controlling at least one sensor installed in the vehicle such that the at least one sensor collects data with a total size less than or equal to the determined target size; transmitting the data collected by the at least one sensor to the server; and controlling a function of the vehicle according to a control command received from the server, in response to the transmission of the data.

The method may further include turning off some of the at least one sensor such that data with a total size less than or equal to the determined target size may be collected.

The method may further include reducing a sensing capability of the at least one sensor such that data with a total size less than or equal to the determined target size may be collected.

The determining of the target size may include determining the target size such that that an expected time from a time point of starting collection of the data to a time point of execution of the control command may be less than or equal to a threshold time.

The determining of the target size may include selecting the threshold time from among a plurality of candidate threshold times according to at least one of a speed of the vehicle or a position of the vehicle.

The method may further include outputting a stability level of autonomous driving corresponding to the determined target size and the threshold time, through an in-vehicle output device.

The determining of the target size may include determining a target size corresponding to data to be transmitted to the server, according to a stability level of autonomous driving corresponding to a method of communication with the server.

According to another embodiment of the disclosure, an electronic apparatus to be installed in a vehicle to control a function of the vehicle includes: a memory storing at least one instruction; and a processor configured to operate according to the at least one instruction, wherein the processor is further configured to identify a state of communication with a server, determine a target size corresponding to data to be transmitted to the server, based on the identified communication state, select some data with a total size less than or equal to the determined target size, from among data obtained from at least one sensor installed in the vehicle, transmit the selected some data to the server, and control a function of the vehicle according to a control command received from the server, in response to transmission of the some data.

Throughout the disclosure, the expression "at least one of a, b or c" indicates only a, only b, only c, both a and b, both a and c, both b and c, all of a, b, and c, or variations thereof.

The disclosure may include certain embodiments and modifications, and particular embodiments thereof are illustrated in the drawings and will be described herein in detail. However, it should be understood that the disclosure is not limited to particular embodiments and includes all modifications, equivalents, and substitutions included in the scope of the disclosure.

In the following description of the embodiments, detailed descriptions of the related art will be omitted when it is deemed that they may unnecessarily obscure the subject matters of the disclosure. Also, numbers (e.g., first and second) used in the process of describing embodiment of the disclosure are merely identification symbols for distinguishing an element from another element.

Also, herein, when an element is referred to as being "connected" or "coupled" to another element, the element may be directly connected or coupled to the other element and may also be connected or coupled to the other element through one or more other intervening elements therebetween unless otherwise specified.

Also, herein, as for elements represented as '. . . portions (units)', '. . . modules', or the like, two or more elements may be combined into one element, or one element may be divided into two or more elements for each subdivided function. Also, each element described below may additionally perform some or all of the functions of other elements in addition to its main functions, and some of the main functions of each element may be exclusively performed by other elements.

Hereinafter, embodiments according to the disclosure will be sequentially described in detail.

According to an architectural flow describing the development of automobile technology, an automobile is expected to have an integrated structure for each function in a current distributed structure and evolve into a structure in which combined domains are controlled by a central controller. That is, with the development of technology, it is expected that data will be centrally processed and cloud connection may also be possible in the future.

Because a lot of data should be processed in order to achieve autonomous driving currently attracting attention, a high-performance processor for processing a large amount of data may be utilized. Such a processor may be installed in a vehicle; however, as an autonomous driving system becomes more sophisticated, it may complicate the manufacturing of a vehicle and increase the manufacturing cost thereof.

In order to overcome these problems, a system in which a vehicle functions to collect environment data around the vehicle and transmit the environment data to a server and the server analyzes the environment data and transmits a control command to the vehicle may be considered.

The most important consideration in an autonomous driving system in which a vehicle and a server are linked to each other may be how rapidly it may respond to an external factor. A rapid response to the external factor may be greatly affected by the communication state between the vehicle and the server. Thus, there may be a need for a method for autonomously driving the vehicle stably even in a situation where the communication state between the vehicle and the server changes.

Moreover, unlike an existing rule-based system, an artificial intelligence (AI) system may be a computer system that may allow a machine to learn, determine, and become more intelligent by itself. Because the AI system may have a higher recognition rate and more accurately understand user tastes as it is used more, existing rule-based systems have been gradually replaced with deep learning-based AI systems.

AI technology may include machine learning (deep learning) and element technologies utilizing machine learning.

Machine learning may be an algorithm technology for classifying/learning the features of input data by itself, and the element technologies may be technologies using a machine learning algorithm such as deep learning and may include technical fields such as linguistic understanding, visual understanding, reasoning/prediction, knowledge representation, and motion control.

Linguistic understanding may be a technology for recognizing and applying/processing human languages/characters and may include natural language processing, machine translation, conversation systems, question and answer, and voice recognition/synthesis. Visual understanding may be a technology for recognizing and processing objects, as done by human vision, and may include object recognition, object tracking, image search, human recognition, scene understanding, space understanding, and image improvement. Reasoning/prediction may be a technology for reasoning and predicting logically by determining information and may include knowledge/probability-based reasoning, optimization prediction, preference-based planning, and recommendation. Knowledge representation may include a technology for automatically processing human experience information into knowledge data, and may include knowledge generation (data creation and classification) and knowledge management (data utilization). Motion control may be a technology for controlling autonomous driving of a vehicle and motion of a robot and may include motion control (navigation, collision, and driving) and operation control (behavior control).

Embodiments of the disclosure relate to a method for safely controlling a vehicle in an autonomous driving system in which the vehicle and a server are linked to each other and an apparatus for performing the method, which will be described below in detail with reference to the accompanying drawings.

FIG. 1 is a diagram illustrating an electronic apparatus 100 installed in a vehicle 10 and a server 200, according to an embodiment of the disclosure.

The vehicle 10 may perform autonomous driving through link with the server 200. As described above, the vehicle 10 may transmit data collected by sensors installed in the vehicle 10 to the server 200, and the server 200 may analyze the data and generate a control command for autonomous driving. The server 200 may transmit the control command to the vehicle 10, and the vehicle 10 may operate according to the control command.

Here, the data collected by the sensors installed in the vehicle 10 may be data about the surrounding environments of the vehicle 10. For example, the data may include data indicating whether there is a risk-of-collision object proximate to the vehicle, factors to be considered in driving or moving the vehicle (e.g., whether there is a shaded area and/or whether an accident has occurred nearby), and/or factors affecting the driving of the vehicle. Hereinafter, for convenience of description, the data will be referred to as 'environment data' or 'sensing data' for example in a case where 'data' is data about the surrounding environment of the vehicle.

The electronic apparatus 100 may be installed in the vehicle 10 to support autonomous driving of the vehicle 10. FIG. 1 illustrates that the electronic apparatus 100 is installed at the roof of the vehicle 10; however, this is merely an example and the electronic apparatus 100 may be installed at various positions (e.g., engine room, chassis, and dashboard).

The electronic apparatus 100 may be installed in the vehicle 10 during the process of manufacturing the vehicle 10, or may be installed in the vehicle 10 after completion of the manufacturing of the vehicle 10.

In an autonomous driving system in which the vehicle 10 and the server 200 are interlinked, the electronic apparatus 100 may enable safe autonomous operation of the vehicle 10 to even in a situation where communication between the vehicle 10 and the server 200 is disrupted. Particularly, the electronic apparatus 100 may minimize the influence of a disrupted communication state on the safety of the autonomous operation of the vehicle 10, by maintenance of a specified time variable for executing control commands received from the server 200.

Hereinafter, the vehicle 10 equipped with the electronic apparatus 100 will be described in more detail with reference to FIG. 2.

Figure 2:
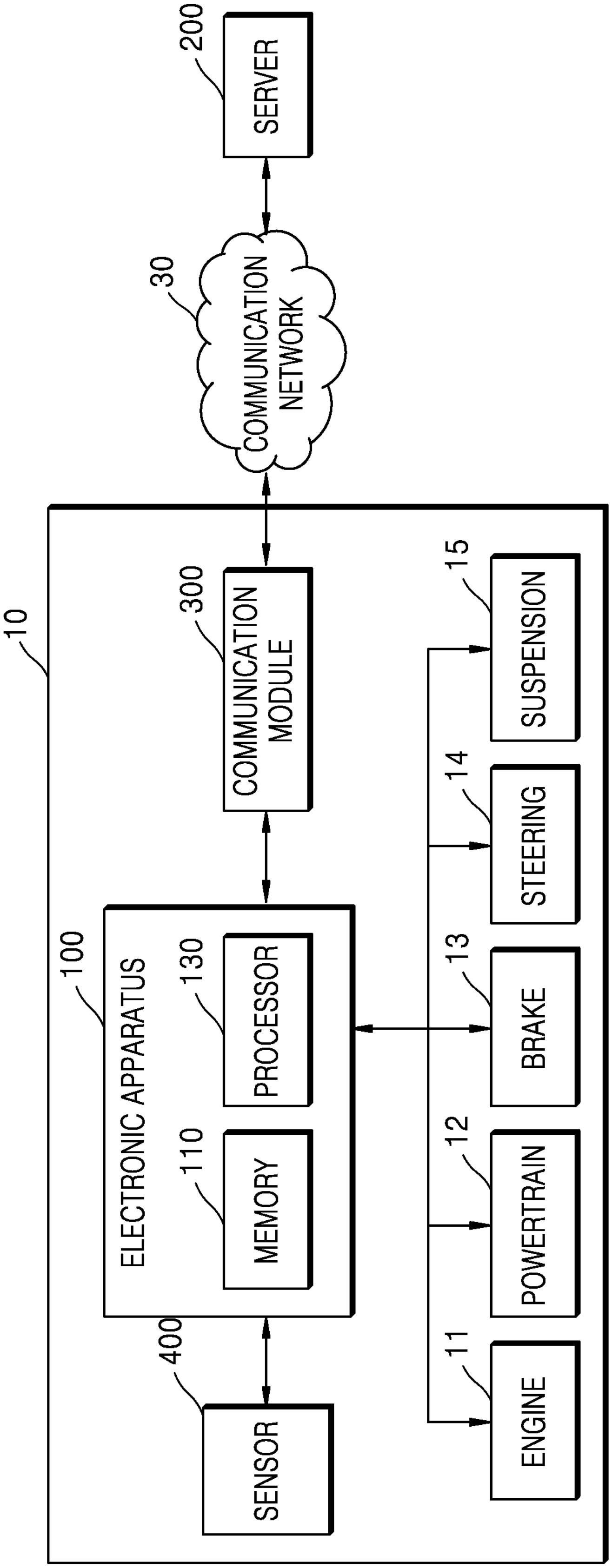
FIG. 2 is a functional block diagram of a vehicle equipped with an electronic apparatus according to an embodiment of the disclosure.

FIG. 2 is a functional block diagram of a vehicle 10 equipped with an electronic apparatus 100 according to an embodiment of the disclosure.

Referring to FIG. 2, an electronic apparatus 100, a communication module 300, and sensors 400 may be installed in the vehicle 10.

First, the sensors 400 may collect environmental data via sensing inputs generated from an external environment of the vehicle 10. The environment data collected by the sensors 400 may be transmitted to the electronic apparatus 100.

In an embodiment of the disclosure, the sensors 400 may include a sensor for detecting an object proximate to the vehicle 10, a sensor for detecting the current position/location of the vehicle 10, a sensor for obtaining images of the environs around the vehicle 10, and/or a sensor for detecting an attitude of the vehicle 10. For example, the sensors 400 may be installed in the vehicle 10, and include a camera, a light detection and ranging sensor (LIDAR), a radio detection and ranging sensor (RADAR), a global positioning system (GPS), an acceleration sensor, and/or a gyroscopic sensor. The sensors 400 installed to the vehicle 10 are not limited to the above examples, and various types of sensors not illustrated may be installed in the vehicle 10. One or more sensors 400 may be installed in the vehicle 10.

The communication module 300 may include communication circuitry that is capable of transceiving data between the electronic apparatus 100 and the server 200, while communicating with the server 200 through a communication network 30. That is, the communication module 300 may transmit environmental data provided from the electronic apparatus 100, to the server 200 through the communication network 30 and may transmit a control command received from the server 200, to the electronic apparatus 100 through the communication network 30. The communication module 300 may include a network interface card (NIC).

In an embodiment of the disclosure, the communication module 300 may communicate with the server 200 using any one of various supportable communication methods. The various supportable communication methods may include, but are not limited to, a 5G mmWave communication method, a 5G SUB6 communication method, and a long-term evolution (LTE) communication method. Both the 5G mmWave communication method and the 5G SUB6 communication method may correspond to the 5G communication method but may be different in available frequency bands.

The communication module 300 may communicate with the server 200 using any one communication method, and then communicate with the server 200 by replacing the same with another communication method. For example, the communication module 300 may communicate with the server 200 by the 5G mmWave communication method and then communicate with the server 200 by converting to the LTE communication method when it is difficult to use the 5G mmWave communication method in a particular area.

When there are various communication methods available for communication with the server 200, the communication module 300 may communicate with the server 200 by a communication method with the higher priority. For example, when the communication module 300 may communicate with the server 200 by the 5G mmWave communication method and by the 5G SUB6 communication method and the priority of the 5G mmWave communication method is higher than the priority of the 5G SUB6 communication method, the communication module 300 may use the 5G mmWave communication method to communicate with the server 200.

The communication module 300 may provide information about the communication state with the server 200 to the electronic apparatus 100. The information about the communication state may include information representing the communication rate with the server 200. When the communication method between the communication module 300 and the server 200 is identified, the communication rate may be identified and thus the information about the communication state may include information representing the communication method.

The electronic apparatus 100 may include a memory 110 and a processor 130.

The memory 110 may store at least one instruction, and the processor 130 may perform an operation for controlling the functions of the vehicle 10 via execution of the at least one instruction. According to an embodiment of the disclosure, the communication module 300 described above may be included in the electronic apparatus 100.

The electronic apparatus 100 may adaptively determine a target size of environment data to be transmitted to the server 200, by considering the communication state between the communication module 300 and the server 200. When the size of the environment data to be transmitted to the server 200 increases, the time utilized to transmit the environment data from the communication module 300 to the server 200 increases, and as a result, a rapid autonomous response to the changing external context of the vehicle 10 may become impossible. Thus, when the communication state between the communication module 300 and the server 200 is stable and sufficient in bandwidth, the electronic apparatus 100 may increase the target size of the environment data as the larger bandwidth and stability would not hinder rapidity of response, and increased data granularity may help generate a more accurate response to an external factor of the vehicle 10. When the communication state between the communication module 300 and the server 200 is suffers disruption, the electronic apparatus 100 may decrease the target size of the environment data to maintain the transmission time, and thus maintain a certain degree of rapidity in autonomous responses to changes in the external context of the vehicle 10.

The server 200 may analyze the environment data received from the electronic apparatus 100 through the communication module 300 and generate a control command indicating how to control the function of the vehicle 10. For example, based on analysis of the environment data, when the server 200 determines that a right turn of the vehicle 10 is impending, the server 200 may generate a control command representing a right turn.

The control command may be provided from the server 200 to the electronic apparatus 100 through the communication module 300. The electronic apparatus 100 may control a function of the vehicle 10 according to the control command. For example, the electronic apparatus 100 may control at least one of an engine 11, a powertrain 12, a brake 13, a steering 14, or a suspension 15 of the vehicle 10 to allow the vehicle 10 to perform a particular function (e.g., a right turn).

FIG. 2 illustrates that the engine 11, the powertrain 12, the brake 13, the steering 14, and the suspension 15 are controlled by the electronic apparatus 100; however, this is merely an example. The electronic apparatus 100 may control various devices such as an air conditioner and lighting installed in the vehicle 10 to perform particular functions.

An operation of the electronic apparatus 100 will be described in more detail with reference to FIG. 3.

Figure 3:
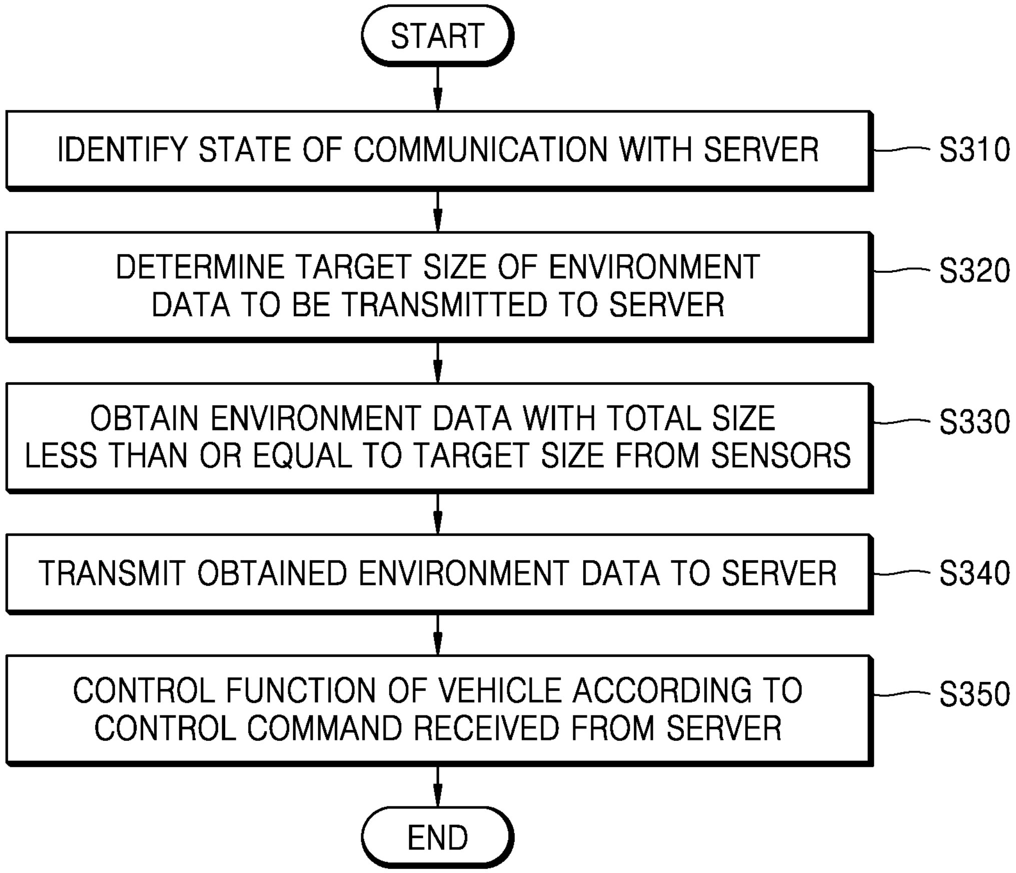
FIG. 3 is a flowchart illustrating a method of controlling a function of a vehicle, according to an embodiment of the disclosure.

FIG. 3 is a flowchart illustrating a method of controlling a function of a vehicle 10, according to an embodiment of the disclosure.

In operation S310, the electronic apparatus 100 may identify a communication state between the communication module 300 and the server 200. The electronic apparatus 100 may receive information regarding the communication state from the communication module 300 and identify the communication state (e.g., quality, stability, bandwidth, etc.) between the communication module 300 and the server 200 according to the received information.

In operation S320, the electronic apparatus 100 may determine a target size of environment data to be transmitted to the server 200, according to the identified communication state. For example, when the communication state indicates a quality over a certain quality threshold (e.g., signal strength, bandwidth, etc.), the target size of the environment data to be transmitted to the server 200 may be increased. When the communication state indicates a quality less than a certain quality threshold, the target size of the environment data to be transmitted to the server 200 may be reduced to enable to maintain a stable data transmission time. A method for the electronic apparatus 100 to determine the target size of the environment data will be described below with reference to FIG. 4 and the like.

In operation S330, the electronic apparatus 100 may control and/or configure the sensors 400 to detect environment data, but in a way such that a size of the collected data is less than or equal to the target size determined in operation S320. That is, electronic apparatus 100 may control operation of the sensors 400 such that the total size of detected environment data collected by the sensors 400 is less than or equal to the target size.

For example, the electronic apparatus 100 may control the sensors 400 such that the total size of environment data collected by the sensors 400 may be less than or equal to the target size, but close to the target size.

As another example, the electronic apparatus 100 may control the sensors 400 such that the total size of environment data collected by the sensors 400 may be less than or equal to the target size and the difference thereof from the target size may be less than or equal to a threshold value. For example, when the target size is 100 Mb and the threshold value is 10 Mb, the total size of the environment data may be about 90 Mb to about 100 Mb.

Turning of a sensing operation of some of the sensors 400 installed in the vehicle 10 or reducing a sensing capability of the sensors 400 installed in the vehicle 10 may be considered as a method of controlling the sensors 400. This will be described below with reference to FIGS. 10 and 11.

In operation S340, the electronic apparatus 100 may transmit the environment data obtained from the sensors 400 to the server 200. The electronic apparatus 100 may convert (e.g., compress) the environment data to render it suitable for the utilized communication method between the communication module 300 and the server 200.

The server 200 may generate a control command for the vehicle by analyzing the environment data received from the electronic apparatus 100. For example, the server 200 may retrieve a control command indicating execution of a function of the vehicle 10 in autonomous operation. The appropriate control command may, in some examples, be selected or generated by inputting the environment data into a trained neural network for machine-learning.

In operation S350, the electronic apparatus 100 may control a function of the vehicle 10 in accordance with the control command received from the server 200. Thus, the vehicle 10 executes an autonomous response to events occurring in the external environment, as detected by the sensors and transmitted in the requisite time to the external server.

As described with reference to FIG. 3, the electronic apparatus 100 may maintain the stability and accuracy of autonomous driving by adaptively determining the target size of the environment data according to the communication state between the communication module 300 and the server 200.

When the target size of the environment data is reduced to be smaller than a certain threshold, a rapid response to the external factor may be maintained. However, the accuracy of autonomous driving response may be reduced due to reductions in the detail of the sensor data. Thus, it may be important to set a target size of the environment data that enables both a rapid and accurate response in the autonomous operation of the vehicle 10.

In an embodiment of the disclosure, when the electronic apparatus 100 determines to collect environment data of a particular size, when the expected time from the start time point of collection of the environment data by the sensors 400 to the time point of execution of the control command is less than or equal to a threshold time, the particular size may be determined as the target size of the environment data. The threshold time may be predetermined in order to ensure a rapid response of the vehicle 10.

The expected time may be divided into detailed times as follows.

① the time for the sensors 400 to collect the environment data; ② the time for the environment data to be transmitted from the sensors 400 to the electronic apparatus 100; ③ the time for the electronic apparatus 100 to convert the environment data and transmit the same to the communication module 300; ④ the time for the communication module 300 to transmit the environment data to the server 200 through the communication network 30; ⑤ the time for the server 200 to analyze the environment data and generate the control command; ⑥ the time for the server 200 to transmit the control command to the communication module 300 through the communication network 30; ⑦ the time for the control command to be transmitted from the communication module 300 to the electronic apparatus 100; and ⑧ the time for the electronic apparatus 100 to control a function of the vehicle 10 according to the control command.

The detailed times listed above may vary depending on the size of the environment data to be transmitted to the server 200. For example, as the size of the environment data increases, it is likely that the detailed time ①, the detailed time ②, the detailed time ③, the detailed time ④, and the detailed time ⑤ will increase.

Particularly, because the detailed times ④ and ⑥ depend on the communication state (particularly the communication rate) between the communication module 300 and the server 200, the electronic apparatus 100 should determine the target size of the environment data to be transmitted the server 200, by considering the communication state.

The electronic apparatus 100 may pre-know how much time it will take to collect environment data of a certain size in a particular communication state. For example, the electronic apparatus 100 may pre-know that 1 second will be taken from the start time point of collection of the environment data to the time point of execution of the control command in the case of collecting 100-Mb environment data in the 5G mmWave communication method and 2 seconds will be taken from the start time point of collection of the environment data to the time point of execution of the control command in the case of collecting 100-Mb environment data in the LTE communication method.

According to an embodiment of the disclosure, the electronic apparatus 100 may calculate the target size of the environment data to be transmitted to the server 200, by inputting information about the communication state and the threshold time into a prestored algorithm.

According to an embodiment of the disclosure, the electronic apparatus 100 may further determine the analysis accuracy by the server 200 when determining the target size by considering the expected time and the threshold time. The analysis accuracy of the server 200 may be related to the detailed time ⑤. Because the detailed time ⑤ increases as the analysis accuracy increases, the electronic apparatus 100 may determine the target size and the analysis accuracy such that the expected time may be less than or equal to the threshold time.

The electronic apparatus 100 may transmit the analysis accuracy to the server 200, and the server 200 may analyze the environment data according to the received analysis accuracy. For example, when the analysis accuracy is 3, the server 200 may analyze the environment data through a first algorithm predetermined; when the analysis accuracy is 2, the server 200 may analyze the environment data through a second algorithm having less complexity than the first algorithm; and when the analysis accuracy is 1, the server 200 may analyze the environment data through a third algorithm having less complexity than the second algorithm. The first algorithm may include a first neural network, the second algorithm may include a second neural network having fewer layers than the first neural network, and the third algorithm may include a third neural network having fewer layers than the second neural network.

Figure 4:
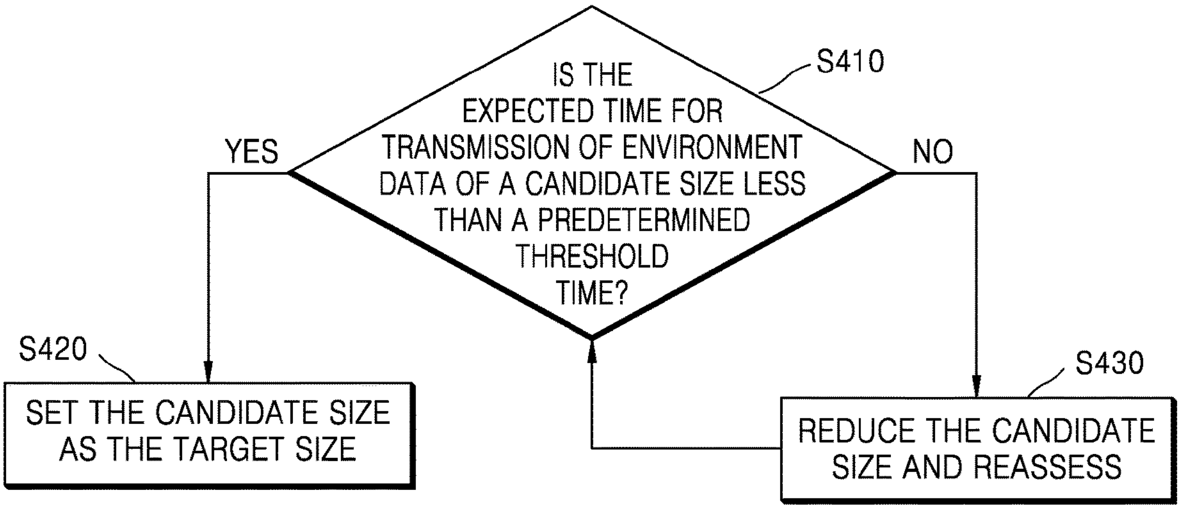
FIG. 4 is a diagram for describing a method of determining a target size of environment data to be transmitted to a server, according to an embodiment of the disclosure.

FIG. 4 is a diagram for describing a method of determining the target size of the environment data to be transmitted to the server 200, according to an embodiment of the disclosure.

Referring to FIG. 4, in operation S410, the electronic apparatus 100 may determine whether a predictive expected time for transmission of environment data to the external server for data having a candidate size is less than a predetermined threshold time.

In operation S420, when the expected time is less than the threshold time, it can be determined that the candidate size is appropriate. Thus, the candidate size may be set as the target size for the environment data. Even when the certain size is increased, when the expected time is less than the threshold time, the target size may be determined as a size greater than the certain size. That is, the electronic apparatus 100 may determine, as the target size, the greatest size among various sizes that cause an expected time less than the threshold time. As described above, the threshold time is to ensure a rapid response of the vehicle 10; however, because the safety may not be ensured by the rapid response, environment data of the maximum size is to be collected within the range in which the rapid response is possible.

In operation S430, when the expected time is greater than or equal to the threshold time, it may be determined that the candidate size is too large for transmission within the threshold time. Thus, the electronic apparatus 100 may reduce the candidate size and reassess the reduced candidate size by re-performing operation S410.

Moreover, the threshold time may vary depending on the current situation of the vehicle 10. For example, when the vehicle 10 is driving at high speed (e.g., above a certain speed threshold), the threshold time should be short, and when the vehicle 10 is driving at low speed (e.g., below a certain speed threshold), it is likely that a problem will not occur even when the threshold time is long.

FIG. 5 is a diagram for describing a method of determining a threshold time used to determine a target size, according to an embodiment of the disclosure.

As illustrated in FIG. 5, in some embodiments, multiple candidate threshold times may be generated by the electronic apparatus 100, which may then select a particular threshold time from among the various candidate threshold times. The selection may be made by considering the speed of the vehicle 10 and the current position of the vehicle 10. For example, the current position of the vehicle 10 may indicate whether the vehicle 10 is located in a section pre-designated as dangerous, in which case the candidate threshold time is reduced to ensure faster responses by the autonomous operation of the vehicle 10.

As illustrated in FIG. 5, when the speed of the vehicle 10 is 30 km/h or less and the vehicle 10 is located in a section of risk 1, 1 second may be selected as the threshold time.

Referring to FIG. 5, it may be seen that the threshold time decreases as the speed of the vehicle 10 increases. As an example, when the speed of the vehicle 10 is 30 km/h or less and the vehicle 10 is located in a section of risk 1, the threshold time may be 1 second, and when the speed of the vehicle 10 is 31 km/h or more and 60 km/h or less and the vehicle 10 is located in a section of risk 1, the threshold time may be 0.8 seconds.

Likewise, the threshold time may decrease as the risk of the vehicle 10 increases. As an example, when the speed of the vehicle 10 is 30 km/h or less and the vehicle 10 is located in a section of risk 1, the threshold time may be 1 second, and when the speed of the vehicle 10 is 30 km/h or less and the vehicle 10 is located in a section of risk 2, the threshold time may be 0.8 seconds.

FIG. 5 illustrates that the electronic apparatus 100 selects the threshold time by considering both the speed of the vehicle 10 and the position of the vehicle 10; however, this is merely an example. The electronic apparatus 100 may select the threshold time by considering the speed of the vehicle 10 or may select the threshold time by considering the position of the vehicle 10.

According to an embodiment of the disclosure, the electronic apparatus 100 may determine a target time for determining a target size by increasing or decreasing a preset threshold time according to at least one of the speed of the vehicle 10 or the risk of an area in which the vehicle 10 is located. For example, when the preset threshold time corresponds to a case where the speed of the vehicle 10 is about 31 km/h to about 60 km/h and the risk is 2, when the speed of the vehicle 10 is greater than a speed ranging from about 31 km/h to about 60 km/h or the risk is greater than 2, the preset threshold time may be reduced.

Further, a stability level may be calculated as a representation of a stability (e.g., safety) of the autonomous driving operation, which may be based on the threshold time and target size. Faster autonomous responses of the vehicle 10 are facilitated by shorter threshold time values. Furthermore, the accuracy of autonomous driving responses increases as the target size of the environment data increases (e.g., due to richer and more detailed data). Thus, the stability of autonomous operation of the vehicle 10 may be identified by considering both the threshold time and the target size of the environment data.

FIG. 6 is a diagram illustrating the stability level of autonomous driving corresponding to the target size and the threshold time of the environment data to be transmitted to the server 200, according to an embodiment of the disclosure.

Referring to FIG. 6, it may be seen that an estimated stability level of autonomous driving may increase, as the target size of the environment data to be transmitted to the server 200 increases, and the stability level of autonomous driving increases as the threshold time decreases. For example, when the threshold time is about 0.1 s to about 0.4 s, the stability level may be 2 when the target size of the environment data is 10 Mb or less, and the stability level may be 3 when the target size of the environment data is about 51 Mb to about 100 Mb. Also, when the target size of the environment data is 10 Mb or less, the stability level may be 2 when the threshold time is about 0.1 s to about 0.4 s, and the stability level may be 1 when the threshold time is 1 s.

When the stability level of autonomous driving is identified, the electronic apparatus 100 may output the stability level of autonomous driving through an output device of the vehicle 10, for example, a speaker or a display. The stability level of autonomous driving may represent an autonomous driving mode. The degree of driver's intervention may vary depending on the autonomous driving mode. For example, no driver's intervention may be required in an autonomous driving mode where the stability level of autonomous driving is 3, and some driver's intervention (e.g., looking ahead while holding the steering wheel) may be desirable in an autonomous driving mode where the stability level of autonomous driving is 2. Much user intervention (e.g., being able to operate the brake at any time by looking ahead while holding the steering wheel) may be mandated in an autonomous driving mode where the stability level of autonomous driving is 1.

By notifying the driver of an estimated stability level of present autonomous driving operations (e.g., the autonomous driving mode), the driver may be informed as to periods where more or less human intervention may be necessary to respond to events occurring in the external environment during autonomous operation of the vehicle.

FIG. 6 illustrates that the stability level of autonomous driving is determined by considering both the target size and the threshold time; however, this is merely an example. The electronic apparatus 100 may consider the stability level of autonomous driving by considering the target size or may consider the stability level of autonomous driving by considering the threshold time.

Figure 7:
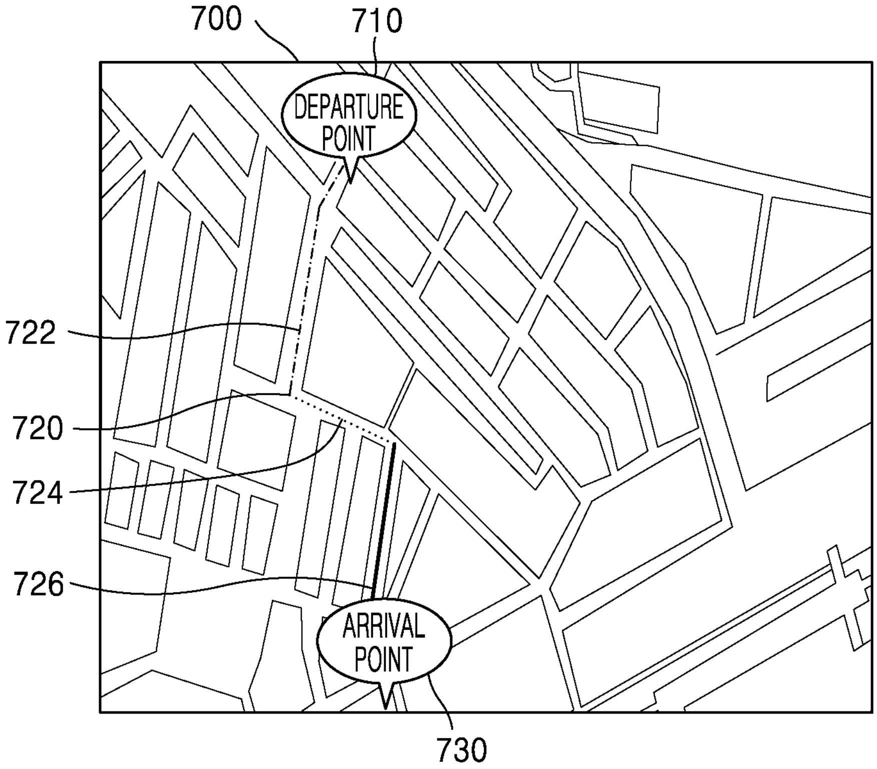
FIG. 7 is a diagram for describing that the stability level of autonomous driving may be predicted for each section in a route between a departure point and an arrival point, according to an embodiment of the disclosure.

FIG. 7 is a diagram for describing that the stability level of autonomous driving may be predicted for each section in a route between a departure point and an arrival point, according to an embodiment of the disclosure.

When a departure point 710 and an arrival point 730 are set through a navigation 700 of the vehicle 10, the electronic apparatus 100 may predict a plurality of stability levels of autonomous driving for each of the sections 722, 724, and 726, in the overall route 720 between the departure point 710 and the arrival point 730, and output the respective predicted stability levels for each section.

The electronic apparatus 100 may pre-obtain information about in which communication state communication is performed with the server 200 in each of the sections 722, 724, and 726 in the route and may predict the stability level of autonomous driving in each section based on the communication state with the server 200. When the communication state is identified, the electronic apparatus 100 may calculate the stability level of autonomous driving in each section according to the above embodiment of the disclosure.

As illustrated in FIG. 7, the electronic apparatus 100 may display the route 720 between the departure point 710 and the arrival point 730 differently in each section according to predicted stability level. For example, the section 722 of stability level 3 may be displayed as a green line, the section 724 of stability level 2 may be displayed as an orange line, and the section 726 of stability level 1 may be displayed as a red line. As another example, the electronic apparatus 100 may display the predicted stability level of the sections of the route in text.

When the driver drives along the route 720 between the departure point 710 and the arrival point 730, the driver may be informed as to road sections where more or less human intervention may be necessary to respond to events occurring in the external environment during autonomous navigation of the vehicle.

FIG. 8 is a diagram for describing a method of selecting a recommended route from among various routes between a departure point and an arrival point, based on the predicted stability level of autonomous driving, according to an embodiment of the disclosure.

In an embodiment of the disclosure, when there are various routes connecting the departure point and arrival point, the electronic apparatus 100 may calculate stability levels of subsections of each prospective route, calculate an average of predicted stability level of each route, and then select a recommended route according to the calculated average.

Referring to FIG. 8, when there are a route A and a route B connecting the departure point and arrival point, the electronic apparatus 100 may determine the predicted stability level of each of a section a-1, a section a-2, and a section a-3 of the route A and the predicted stability level of each of a section b-1, a section b-2, and a section b-3 of the route B.

The electronic apparatus 100 may calculate the average of predicted stability level of the entirety of route A and the entirety of route B. These calculations may, for example, consider the driving time in each section. For example, the electronic apparatus 100 may calculate the average of predicted stability level by weight-averaging the predicted stability level in each section of each route according to each driving time. Particularly, the electronic apparatus 100 may calculate the average of the predicted stability level of the route A as (3*0.4)+(1*0.3)+(2*0.3) and calculate the average predicted stability level of the route B as (2*0.5)+(3*0.3)+(2*0.2). The weight multiplied by the predicted stability level of each section of the route may be calculated by normalizing the sum of driving times to 1. That is, because the total driving time of the route A is 100 minutes, the weight multiplied by the predicted stability level 3 of the section a-1 may be determined as 40/100.

When the average of predicted stability level of the route A is 2.1 and the average of predicted stability level of the route B is 2.3, the electronic apparatus 100 may automatically select route B as the recommended route, due to route B having the higher average of predicted stability level.

The above method of selecting the recommended route is merely an example, and the electronic apparatus 100 may select the recommended route by further considering the toll, the total driving time, and/or the like when driving along each route.

FIG. 9 is a diagram for describing a method of determining the target size of the environment data to be transmitted to the server 200, according to the communication method (e.g., the type of communication) between the vehicle 10 and the server 200, according to an embodiment of the disclosure.

The electronic apparatus 100 may select the stability level of autonomous driving (i.e., the autonomous driving mode) corresponding to the communication method between the vehicle 10 and the server 200 and determine the target size of the environment data corresponding to the selected stability level of autonomous driving.

In the above, the target size is determined and the stability level of autonomous driving is determined by considering the communication state between the vehicle 10 and the server 200, the expected time, and the threshold time; however, according to an embodiment of the disclosure, the stability level of autonomous driving may be determined and the target size may be determined according to the communication method between the vehicle 10 and the server 200.

As illustrated in FIG. 9, various communication methods available between the communication module 300 and the server 200, various stability levels of autonomous driving, and various target sizes of the environment data may be mapped to each other. For example, when the communication module 300 and the server 200 communicate by the 5G mmWave communication method, the stability level of autonomous driving may be determined as 3 and the target size may be determined as 100 Mb. Also, when the communication module 300 and the server 200 communicate by the 5G SUB6 communication method, the stability level of autonomous driving may be determined as 2 and the target size may be determined as 50 Mb.

In the embodiment illustrated in FIG. 9, the communication method/type may be considered to avoid an increase in the time utilized to calculate the target size of the environment data.

Hereinafter, a method for the electronic apparatus 100 to obtain the environment data from the sensors 400 after the target size is determined will be described.

FIGS. 10 and 11 are diagrams for describing a method of selecting the sensor 400 to be turned off from among the sensors 400 installed in the vehicle 10 by considering the movement direction of the vehicle 10, according to an embodiment of the disclosure.

When the target size of the environment data to be transmitted to the server 200 is determined, the electronic apparatus 100 may control the function of the sensors 400 such that the environment data collected by the sensors 400 falls within the determined target size.

In an embodiment of the disclosure, the electronic apparatus 100 may reduce the total size of the environment data collected by the sensors 400, by, for example, deactivating some of the sensors 400. This may be useful when the total size of the environment data collected in a state where all of the sensors 400 are turned on is greater than the target size of the environment data to be transmitted to the server 200.

The electronic apparatus 100 may select the sensor 400 to be deactivated from among the sensors 400, by considering at least one of the movement direction of the vehicle 10 or the position of the vehicle 10. For example, the position of the vehicle 10 may allow consideration of a risk of in view of subregions of the vehicle, directionality thereof, etc.

For example, as illustrated in FIG. 10, when the vehicle 10 is moving forward, the electronic apparatus 100 may deactivate a rear camera, a rear LIDAR sensor, a side LIDAR sensor, and a gyro sensor, such that the environment data collection ceases from the deactivated sensors 400.

Also, as illustrated in FIG. 11, when the vehicle 10 is turning right, the electronic apparatus 100 may deactivate the rear camera and the rear LIDAR such that the environment data is no longer collected by the deactivated sensors 400.

The electronic apparatus 100 may predetermine the sensors 400 that should be sequentially deactivated according to at least one of the movement direction of the vehicle 10 or the position of the vehicle 10 and may sequentially deactivate the sensors 400 according to the priority such that the total size of the environment data collected by the sensors 400 may be less than or equal to the target size of the environment data to be transmitted to the server 200.

In another embodiment of the disclosure, the electronic apparatus 100 may reduce the sensing capability of the sensors 400 such that the size of the environment data collected by the sensors 400 may be less than or equal to the target size of the environment data to be transmitted to the server 200. For example, the electronic apparatus 100 may reduce the total size of the environment data collected by the sensors 400, by reducing the resolution of an image obtained by the camera or by reducing the range (distance or area) detected by the LIDAR or the radar.

The electronic apparatus 100 may adaptively determine the degree of reduction in the sensing capability according to the target size of the environment data to be transmitted to the server 200. For example, when the target size of the environment data to be transmitted to the server 200 is a first size, the resolution of an image obtained by the camera may be determined as UHD (3840*2160); when the target size of the environment data to be transmitted to the server 200 is a second size less than the first size, the resolution of an image obtained by the camera may be determined as MD (1920*1080); and when the target size of the environment data to be transmitted to the server 200 is a third size less than the second size, the resolution of an image obtained by the camera may be determined as HD (1280*720).

Figure 12:
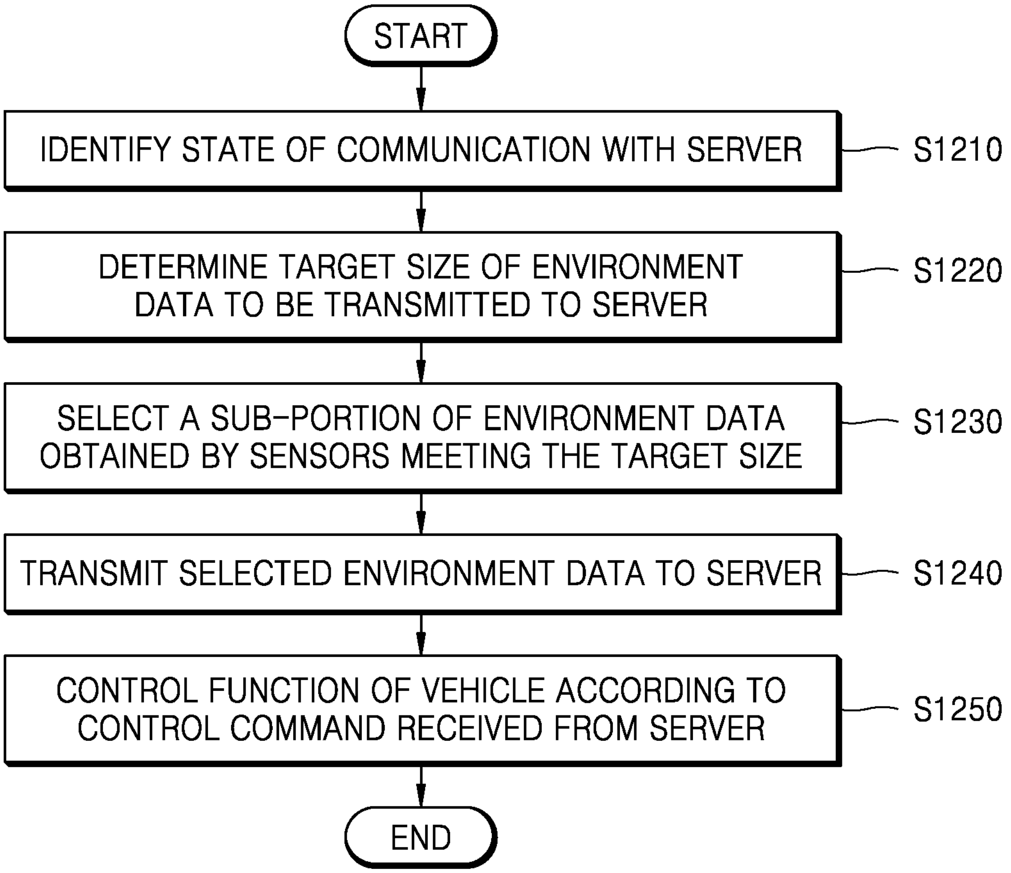
FIG. 12 is a flowchart illustrating a method of controlling a function of a vehicle, according to another embodiment of the disclosure.

FIG. 12 is a flowchart illustrating a method of controlling a function of the vehicle 10, according to another embodiment of the disclosure.

In operation S1210, the electronic apparatus 100 may identify the communication state between the communication module 300 and the server 200. The electronic apparatus 100 may receive information about the communication state from the communication module 300 and identify the communication state between the communication module 300 and the server 200 according to the received information.

In operation S1220, the electronic apparatus 100 may determine the target size of the environment data to be transmitted to the server 200, according to the identified communication state. Because a method of determining the target size of the environment data to be transmitted to the server 200 has been described above, redundant descriptions thereof will be omitted for conciseness.

In operation S1230, the electronic apparatus 100 may select some of the environment data already obtained from the sensors 400. When the total size of the environment data obtained from the sensors 400 is greater than the target size determined in operation S1220, the electronic apparatus 100 may select a sub-portion of the obtained environment data from among the environment data obtained from the sensors 400, such that the total size of the sub-portion is less than or equal to the target size. The electronic apparatus 100 may therefore select some environment data having a total size less than or equal to the target size, and, when different configurations of the sub-portion of data are possible, select a particular configuration have a size closest to the target size for transmission to the external server.

The embodiment of illustrated in FIG. 3 relates to a case where the target size of the environment data to be transmitted to the server 200 is determined before receiving the environment data from the sensors 400; however, the embodiment illustrated in FIG. 12 may be useful when the electronic apparatus 100 may not control the function of the sensors 400 or has already received the environment data from the sensors 400.

When selecting some of the environment data, the electronic apparatus 100 may consider the priority of the environment data, which will be described below with reference to FIGS. 13 and 14.

In operation S1240, the electronic apparatus 100 may transmit some of the environment data obtained from the sensors 400 to the server 200. The electronic apparatus 100 may convert (e.g., compress) the environment data to be suitable for the communication method between the communication module 300 and the server 200.

The server 200 may generate a control command by analyzing the environment data received from the electronic apparatus 100. For example, the server 200 may obtain a control command indicating how the vehicle 10 should function, by inputting the environment data into a trained neural network.

In operation S1250, the electronic apparatus 100 may control a function of the vehicle 10 according to the control command received from the server 200 as a response to the environment data.

FIGS. 13 and 14 are diagrams for describing a method of selecting the environment data to be transmitted to the server 200 from among the environment data collected by the sensors 400 by considering the movement direction of the vehicle 10, according to an embodiment of the disclosure.

The electronic apparatus 100 may select some of the environment data obtained from the sensors 400 according to at least one of the movement direction of the vehicle 10 or the position of the vehicle 10. The position of the vehicle 10 may represent the risk level of a region in which the vehicle 10 is located.

As illustrated in FIG. 13, when the vehicle 10 is moving forward, the electronic apparatus 100 may select the environment data collected by the front camera, the front LIDAR, the GPS, and the acceleration sensor as the environment data transmitted to the server 200.

Also, as illustrated in FIG. 14, when the vehicle 10 is turning right, the electronic apparatus 100 may select the environment data collected by the front camera, the front LIDAR, the side LIDAR, the GPS, the acceleration sensor, and the gyro sensor as the environment data transmitted to the server 200.

The electronic apparatus 100 may preset the priority between different sets of environment data collected by different sensors, by considering at least one of the movement direction of the vehicle 10 or the position of the vehicle 10. Also, the electronic apparatus 100 may sequentially select the environment data to be transmitted to the server 200 according to the preset priority such that the total size of the selected environment data may be less than or equal to the target size and may be closest to the target size.

Moreover, it has been described above that the electronic apparatus 100 actively determines the target size of the environment data to be transmitted to the server 200; however, according to an embodiment of the disclosure, the server 200 may request the electronic apparatus 100 to reduce the size of the environment data. The server 200 may transmit, to the electronic apparatus 100, target size information of the environment data that the server 200 is to receive. Alternatively, the server 200 may request the electronic apparatus 100 to reduce the size of the environment data, and the electronic apparatus 100 may determine the target size according to the reduction request.

When the server 200 makes a request for reduction of the size of the environment data, it may be useful when the load applied to the server 200 is great. For example, when a great number of vehicles 10 autonomously drive in link with the server 200, because the load applied to the server 200 increases, the server 200 may reduce the load to be processed, by transmitting a request for reduction of the size of the environment data to the vehicle 10.

In an embodiment of the disclosure, at least one of the operations performed by the electronic apparatus 100 (particularly by the processor 130 of the electronic apparatus 100) may be performed by using AI technology. At least one operation performed by using AI technology will be described below in detail with reference to FIG. 15.

Figure 15:
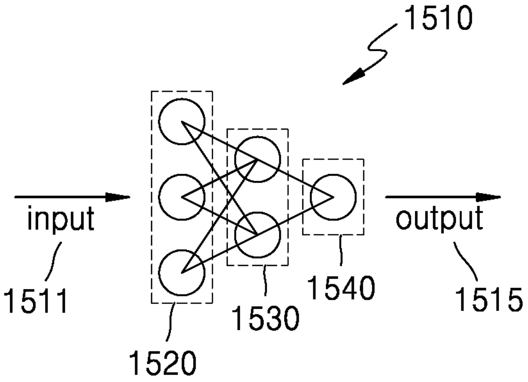
FIG. 15 is a diagram for describing an operation performed by using artificial intelligence (AI) technology, in an embodiment of the disclosure.

FIG. 15 is a diagram for describing an operation performed by using AI technology.

Particularly, at least one of i) an operation of determining the target size, ii) an operation of selecting the threshold time, iii) an operation of selecting the sensor 400 to be turned off from among the sensors 400, or iv) an operation of selecting some environment data to be transmitted to the server 200 from among the environment data, which are performed by the electronic apparatus 100, may be performed by using AI technology that performs an operation through a neural network. For example, it may be performed based on AI based on the communication state between the server 200 and the vehicle 10 described above.

AI technology may be a technology for obtaining a desired result by processing (e.g., analyzing and/or classifying) input data based on operation through a neural network.

The AI technology may be implemented by using an algorithm. Here, an algorithm or a set of algorithms for implementing the AI technology may be referred to as a neural network. The neural network may receive input data, perform an operation for analysis and/or classification, and output result data. In order for the neural network to accurately output the result data corresponding to the input data, it is desirable to train the neural network. Here, 'training' may represent training the neural network such that the neural network may personally find and learn a method of analyzing a plurality of pieces of input data to the neural network, a method of classifying the plurality of pieces of input data, and/or a method of extracting features for generating result data from the plurality of pieces of input data. Particularly, through a training process, the neural network may optimize the weight values in the neural network based on the training data. Then, a desired result may be output by processing the input data through the neural network having optimized weight values.

The neural network may be classified as a deep neural network when there are a plurality of hidden layers as internal layers for performing an operation, that is, when the depth of the neural network for performing an operation increases. Examples of the neural network may include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), and Deep Q-Networks. Also, the neural network may be subdivided. For example, the CNN neural network may be subdivided into Deep Convolution Neural Networks (DCNNs) or CapsNet neural networks (not illustrated).

'AI model' may refer to a neural network including at least one layer that receives input data and operates to output a desired result. Also, 'AI model' may refer to an algorithm for outputting a desired result by performing an operation through a neural network, a set of algorithms, a processor for executing an algorithm (or a set of algorithms), software for executing an algorithm (or a set of algorithms), or hardware for executing an algorithm (or a set of algorithms).

At least one of i) the operation of determining the target size, ii) the operation of selecting the threshold time, iii) the operation of selecting the sensor 400 to be turned off from among the sensors 400, or iv) the operation of selecting some of the environment data may be performed based on the AI model.

Referring to FIG. 15, a neural network 1510 may be trained by receiving training data. Also, the trained neural network 1510 may receive input data 1511 (e.g., communication state information or target size information of the environment data) through an input terminal 1520, and the input terminal 1520, a hidden layer 1530, and an output terminal 1540 may perform an operation for outputting output data 1515 by analyzing the input data 1511 and data transmitted from the previous layer. In FIG. 15, one hidden layer 1530 is illustrated; however, this is merely an example and the hidden layer 1530 may include a plurality of layers.

For example, the neural network 1510 may learn a method of determining the target size of the environment data to be transmitted to the server 200 based on the communication state information. The trained neural network 1510 may receive the communication state information and determine the target size of the environment data.

As another example, based on the target size information of the environment data, the neural network 1510 may learn a method of selecting the sensor 400 to be turned off from among the sensors 400 and/or a method of selecting some of the environment data. The trained neural network 1510 may receive the target size information of the environment data and select the sensor 400 to be turned off from among the sensors 400 and/or some of the environment data.

In an embodiment of the disclosure, a neural network for performing at least one of i) an operation of determining the target size of the environment data, ii) an operation of selecting the threshold time, iii) an operation of selecting the sensor 400 to be turned off from among the sensors 400, or iv) an operation of selecting some of the environment data may be implemented in a processor (e.g., 130 of FIG. 2).

Alternatively, the neural network performing at least one of i) the operation of determining the target size of the environment data, ii) the operation of selecting the threshold time, iii) the operation of selecting the sensor 400 to be turned off from among the sensors 400, or iv) the operation of selecting some of the environment data may be implemented in an electronic apparatus (not illustrated) or a processor (not illustrated) that is distinct from the electronic apparatus 100.

The operation through the neural network described above may be performed by a server (not illustrated) that may communicate with the electronic apparatus 100 according to an embodiment of the disclosure through a wireless communication network. Communication between the electronic apparatus 100 and a server (not illustrated) will be described with reference to FIG. 16.

Figure 16:
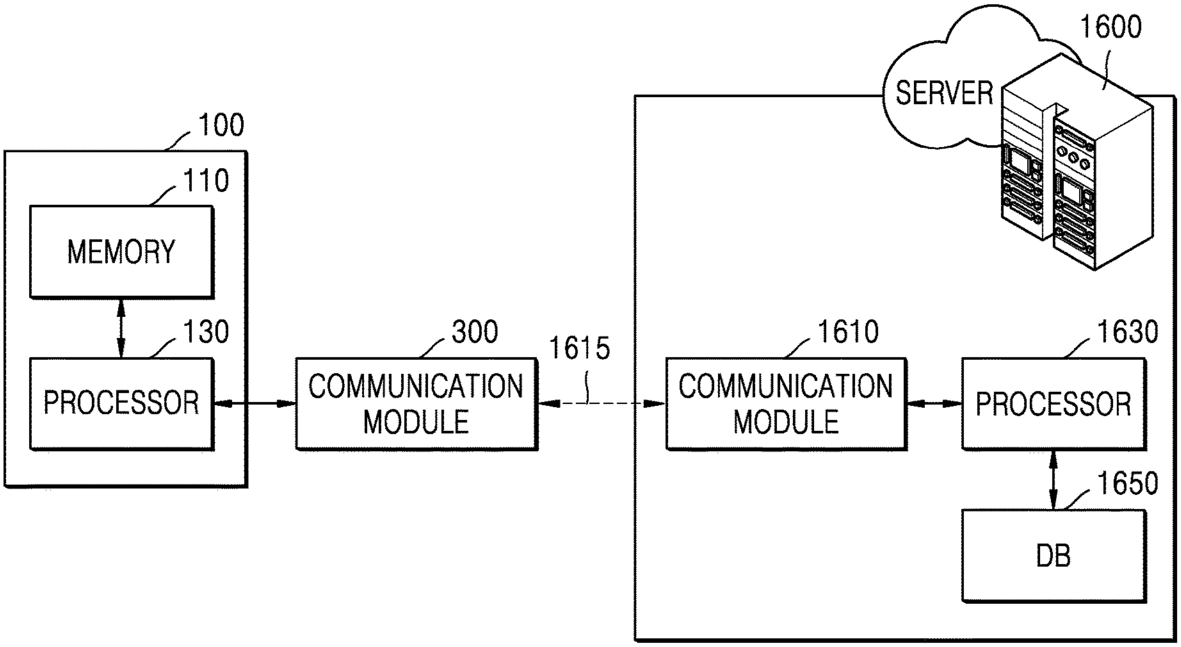
FIG. 16 is a diagram illustrating a server and an electronic apparatus operating in conjunction with the server.

Referring to FIG. 16, a server 1600 may include a communication module 1610 communicating with the electronic apparatus 100 and a processor 1630 executing at least one instruction. The server 1600 may be the server 200 illustrated in FIGS. 1 and 2.

For example, the processor 1630 of the server 1600 may obtain information about the communication state, and determine the target size of the environment data to be transmitted to the server 200 or 1600 according to the communication state information. The communication module 1610 may transmit the target size information of the environment data to the electronic apparatus 100.

In an embodiment of the disclosure, the server 1600 may determine the target size of the environment data by performing an operation through the neural network 1510 described with reference to FIG. 15. Particularly, the server 1600 may train an AI model and store the trained AI model. Also, the server 1600 may determine the target size of the environment data described above by using the trained AI model.

In general, in terms of the memory storage capacity, the operation processing speed, the collection capability of a training data set, and/or the like, the electronic apparatus 100 may be restricted compared to the server 1600. Thus, after the server 1600 performs an operation requiring storage of a large amount of data and a large amount of computation, data and/or the AI model may be transmitted to the electronic apparatus 100 through a communication network. Then, the electronic apparatus 100 may rapidly and easily perform an operation without a processor having a large-capacity memory and a fast operation capability by receiving and using the data and/or the AI model through the server 1600.

In an embodiment of the disclosure, the server 1600 may include the neural network 1510 described with reference to FIG. 15. Particularly, the neural network 1510 included in the server 1600 may perform an operation for at least one of i) the operation of determining the target size of the environment data, ii) the operation of selecting the threshold time, iii) the operation of selecting the sensor 400 to be turned off from among the sensors 400, or iv) the operation of selecting some of the environment data.

The communication module 300 may communicate with an external device (e.g., the server 200 or 1600) through a wireless communication network 1615. Here, the external device (not illustrated) may include a server (e.g., 200 or 1600) that may perform at least one of the operations executed by the electronic apparatus 100 or may transmit data utilized by the electronic apparatus 100.

The communication module 300 may include at least one communication module such as a short-range communication module, a wired communication module, a mobile communication module, and/or a broadcast receiving module. Here, the communication module 300 may include a tuner performing broadcast reception and/or a communication module capable of performing data transmission/reception through a network conforming to a communication standard such as a communication method using Bluetooth, Wireless LAN (WLAN) (WiFi), Wireless Broadband (WiBro), World Interoperability for Microwave Access (WiMAX), CDMA, WCDMA, Internet, 3G, 4G, 5G, and/or millimeter Wave (mmWave).

For example, the communication module 300 may rapidly transmit/receive a large amount of data by performing communication by using mmWave. Particularly, the vehicle 10 may increase the safety of the vehicle 10 and/or the user's convenience by rapidly receiving a large amount of data by using millimeter waves and rapidly providing user content (e.g., movie or music) and/or data beneficial for the safety of the vehicle 10 (e.g., data for autonomous driving and/or data for a navigation service).

The communication module 300 may communicate with another device (e.g., the server 200 or 1600) located at a long distance through a communication network conforming to a communication standard such as 3G, 4G, and/or 5G. Here, the communication module 300 performing communication with another device located at a long distance may be referred to as a 'long-range communication module'.

Referring to FIG. 16, the server 1600 may include a communication module 1610 and a processor 1630. Also, the server 1600 may further include a database (DB) 1650.

The communication module 1610 may include one or more elements for allowing communication with the electronic apparatus 100. Because the detailed configuration of the communication module 1610 corresponds to the configuration of the communication module 300 described above, redundant descriptions thereof will be omitted for conciseness.

For example, the communication module 1610 may communicate with another device (e.g., the electronic apparatus 100) located at a long distance through a communication network conforming to a communication standard such as Internet, 3G, 4G, and/or 5G.

The processor 1630 may control an overall operation of the server 1600. For example, the processor 1630 may perform desired operations by executing at least one of programs or at least one instruction of the server 1600.

The DB 1650 may include a memory (not illustrated) and store at least one of at least one instruction, programs, or data for the server 1600 to perform a certain operation in the memory (not illustrated). Also, the DB 1650 may store data for the server 1600 to perform an operation according to the neural network.

In an embodiment of the disclosure, the server 1600 may store the neural network 1510 described with reference to FIG. 15. The neural network 1510 may be stored in at least one of the processor 1630 or the DB 1650. The neural network 1510 included in the server 1600 may be a neural network that has been trained.

In an embodiment of the disclosure, the server 1600 may determine the target size of the environment data described above by using the neural network internally included and transmit the determined target size information to the communication module 300 of the electronic apparatus 100 through the communication module 1610.

Also, the server 1600 may transmit the trained neural network to the communication module 300 of the electronic apparatus 100 through the communication module 1610. Then, the electronic apparatus 100 may obtain and store the trained neural network and may obtain desired output data through the neural network.

Figure 17:
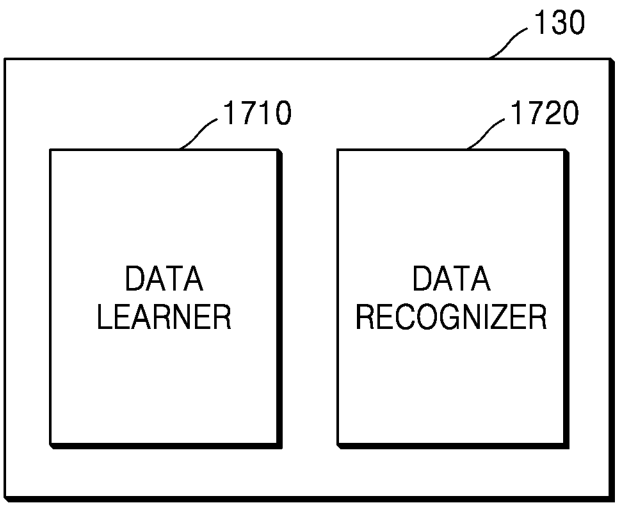
FIG. 17 is a block diagram of a processor included in an electronic apparatus, according to an embodiment of the disclosure.

FIG. 17 is a block diagram of the processor 130 included in the electronic apparatus 100, according to some embodiments of the disclosure.

Referring to FIG. 17, the processor 130 according to some embodiments of the disclosure may include a data learner 1710 and a data recognizer 1720.

The data learner 1710 may learn a criterion for at least one of i) an operation of determining the target size of the environment data, ii) an operation of selecting the threshold time, iii) an operation of selecting the sensor 400 to be turned off from among the sensors 400, or iv) an operation of selecting some of the environment data.

For example, the data learner 1710 may learn a criterion about which data to use to determine the target size of the environment data and/or how to select the target size of the environment data by using the data.

By obtaining data to be used for training and applying the obtained data to a data recognition model described below, the data learner 1710 may learn a criterion for at least one of i) an operation of determining the target size of the environment data, ii) an operation of selecting the threshold time, iii) an operation of selecting the sensor 400 to be turned off from among the sensors 400, or iv) an operation of selecting some of the environment data.

The data recognizer 1720 may determine the target size of the environment data to be transmitted to the server 200 or 1600 based on the data (e.g., the communication state information). The data recognizer 1720 may determine the target size of the environment data from certain data by using the trained data recognition model. The data recognizer 1720 may determine the target size of the environment data based on certain data by obtaining certain data according to a preset criterion based on training and then using the data recognition model by using the obtained data as an input value. Also, the result value output by the data recognition model by using the obtained data as an input value may be used to update the data recognition model.

At least one of the data learner 1710 or the data recognizer 1720 may be manufactured in the form of at least one hardware chip and mounted on the electronic device 100. For example, at least one of the data learner 1710 or the data recognizer 1720 may be manufactured in the form of a dedicated hardware chip for AI or may be manufactured as a portion of a general-purpose processor (e.g., a central processing unit (CPU) or an application processor) or a graphics processor (e.g., a graphics processing unit (GPU)) and mounted on the electronic apparatus 100 described above.

The data learner 1710 and the data recognizer 1720 may be mounted on one electronic apparatus 100 or may be respectively mounted on separate devices. For example, one of the data learner 1710 and the data recognizer 1720 may be included in the electronic apparatus 100, and the other one may be included in the server 1600. Also, the data learner 1710 and the data recognizer 1720 may provide model data generated by the data learner 1710 to the data recognizer 1720 by wire or wireless, or data input into the data recognizer 1720 may be provided as additional training data to the data learner 1710.

Moreover, at least one of the data learner 1710 or the data recognizer 1720 may be implemented as a software module. When at least one of the data learner 1710 or the data recognizer 1720 is implemented as a software module (or a program module including instructions), the software module may be stored in a non-transitory computer-readable recording medium. Also, in this case, at least one software module may be provided by an operating system (OS) or may be provided by a certain application. Alternatively, some of at least one software module may be provided by an operating system (OS), and the others may be provided by a certain application.

Figure 18:
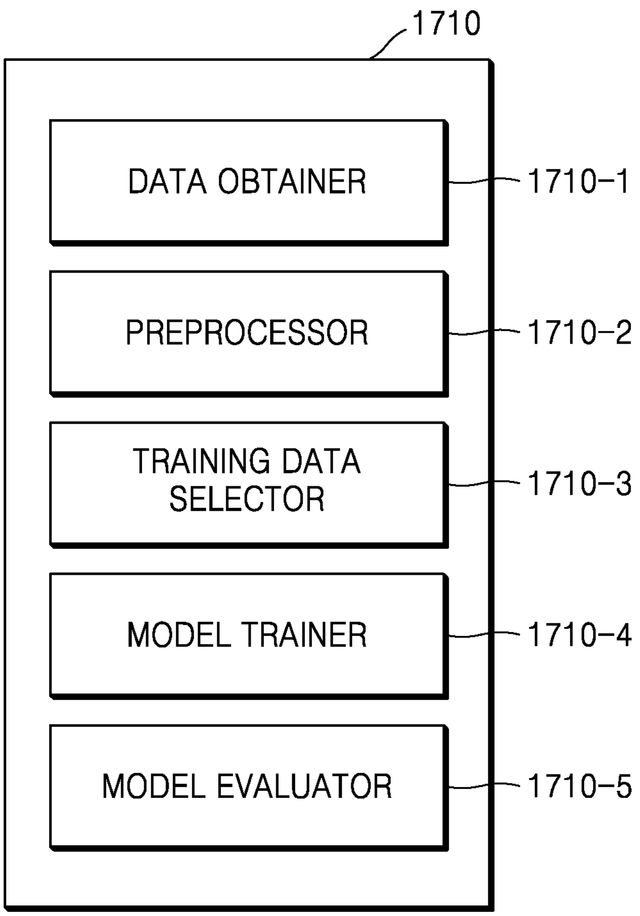
FIG. 18 is a block diagram of a data learner according to an embodiment of the disclosure.

FIG. 18 is a block diagram of the data learner 1710 according to some embodiments of the disclosure.

Referring to FIG. 18, the data learner 1710 according to some embodiments of the disclosure may include a data obtainer 1710-1, a preprocessor 1710-2, a training data selector 1710-3, a model trainer 1710-4, and a model evaluator 1710-5.

The data obtainer 1710-1 may obtain data for at least one operation among determination of the target size of the environment data, selection of the sensor 400 to be turned off, selection of the environment data to be transmitted to the server 200, and determination of the threshold time. The data obtainer 1710-1 may obtain data for learning at least one operation among determination of the target size of the environment data, selection of the sensor 400 to be turned off, selection of the environment data to be transmitted to the server 200, and determination of the threshold time.

The preprocessor 1710-2 may preprocess the data obtained for training. The preprocessor 1710-2 may preprocess the data into a preset format such that the model trainer 1710-4 described below may use the data for training for at least one operation among determination of the target size of the environment data, selection of the sensor 400 to be turned off, selection of the environment data to be transmitted to the server 200, and determination of the threshold time.

The training data selector 1710-3 may select data for training from among the preprocessed data. The selected data may be provided to the model trainer 1710-4. The training data selector 1710-3 may select data for training from among the preprocessed data according to a preset criterion for at least one operation among determination of the target size of the environment data, selection of the sensor 400 to be turned off, selection of the environment data to be transmitted to the server 200, and determination of the threshold time. Also, the training data selector 1710-3 may select data according to a preset criterion based on training by the model trainer 1710-4 described below.

Based on the training data, the model trainer 1710-4 may learn a criterion about how to perform at least one operation among determination of the target size of the environment data, selection of the sensor 400 to be turned off, selection of the environment data to be transmitted to the server 200, and determination of the threshold time. Also, the model trainer 1710-4 may learn a criterion about which training data to use for at least one operation among determination of the target size of the environment data, selection of the sensor 400 to be turned off, selection of the environment data to be transmitted to the server 200, and determination of the threshold time.

Also, the model trainer 1710-4 may use the training data to train the data recognition model used for at least one operation among determination of the target size of the environment data, selection of the sensor 400 to be turned off, selection of the environment data to be transmitted to the server 200, and determination of the threshold time. In this case, the data recognition model may be a pre-generated model. For example, the data recognition model may be a model pre-generated by receiving basic training data (e.g., sample data).

The data recognition model may be generated by considering the application field of the recognition model, the purpose of training, or the computer performance of the device. The data recognition model may be, for example, a model based on a neural network. For example, a model such as a convolutional neural network (CNN), a deep neural network (DNN), a recurrent neural network (RNN), or a bidirectional recurrent deep neural network (BRDNN) may be used as the data recognition model; however, the disclosure is not limited thereto.

According to certain embodiments of the disclosure, when there are a plurality of pre-generated data recognition models, the model trainer 1710-4 may determine a data recognition model having a high relationship between input training data and basic training data as a data recognition model to be trained. In this case, the basic training data may be pre-classified for each type of data, and the data recognition model may be pre-generated for each type of data. For example, the basic training data may be pre-classified by various references such as the region where the training data is generated, the time when the training data is generated, the size of the training data, the genre of the training data, the generator of the training data, and the type of an object in the training data.

Also, the model trainer 1710-4 may train the data recognition model by using, for example, a training algorithm including error back-propagation or gradient descent.

Also, the model trainer 1710-4 may train the data recognition model, for example, through supervised learning using training data as an input value. Also, for example, the model trainer 1710-4 may train the data recognition model through unsupervised learning for finding a criterion for performing at least one operation among determination of the target size of the environment data, selection of the sensor 400 to be turned off, selection of the environment data to be transmitted to the server 200, and determination of the threshold time, by self-learning the type of data for at least one operation among determination of the target size of the environment data, selection of the sensor 400 to be turned off, selection of the environment data to be transmitted to the server 200, and determination of the threshold time, without supervision. Also, for example, the model trainer 1710-4 may train the data recognition model through reinforcement learning using feedback on whether the result of determination of the target size of the environment data according to training is correct.

Also, when the data recognition model is trained, the model trainer 1710-4 may store the trained data recognition model. In this case, the model trainer 1710-4 may store the trained data recognition model in the memory 110 of the electronic apparatus 100 including the data recognizer 1720. Alternatively, the model trainer 1710-4 may store the trained data recognition model in the memory of the server 1600 connected to the electronic apparatus 100 through a wired or wireless network.

In this case, the memory storing the trained data recognition model may also store, for example, commands or data related to at least one other element of the electronic apparatus 100. Also, the memory may store software and/or programs. The program may include, for example, a kernel, middleware, an application programming interface (API), and/or an application program (or "application").

The model evaluator 1710-5 may input evaluation data into the model recognition model and may cause the model trainer 1710-4 to learn when the recognition result output from the evaluation data fails to satisfy a certain criterion. In this case, the evaluation data may be preset data for evaluating the data recognition model.

For example, the model evaluator 1710-5 may evaluate that the certain criterion is not satisfied, when the number or ratio of evaluation data with inaccurate recognition results among the recognition results of the data recognition model about the evaluation data exceeds a preset threshold value. For example, when the certain criterion is defined as a ratio of 2%, the model evaluator 1710-5 may evaluate that the data recognition model is not suitable, when the data recognition model outputs incorrect recognition results with respect to more than 20 pieces of evaluation data among a total of 1,000 pieces of evaluation data.

Moreover, when there are a plurality of trained data recognition models, the model evaluator 1710-5 may evaluate whether each of the trained data recognition models satisfies a certain criterion and determine the model satisfying the certain criterion as a final data recognition model. In this case, when there are a plurality of models satisfying the certain criterion, the model evaluator 1710-5 may determine, as a final data recognition model, any one model or a certain number of models preset in descending order of evaluation scores.

Moreover, at least one of the data obtainer 1710-1, the preprocessor 1710-2, the training data selector 1710-3, the model trainer 1710-4, or the model evaluator 1710-5 in the data learner 1710 may be manufactured in the form of at least one hardware chip and mounted on the electronic apparatus 100. For example, at least one of the data obtainer 1710-1, the preprocessor 1710-2, the training data selector 1710-3, the model trainer 1710-4, or the model evaluator 1710-5 may be manufactured in the form of a dedicated hardware chip for AI or may be manufactured as a portion of a general-purpose processor (e.g., a CPU or an application processor) or a graphic processor (e.g., a GPU) and mounted on the electronic apparatus 100 described above.

Also, the data obtainer 1710-1, the preprocessor 1710-2, the training data selector 1710-3, the model trainer 1710-4, and the model evaluator 1710-5 may be mounted on one electronic apparatus 100 or may be respectively mounted on separate devices. For example, some of the data obtainer 1710-1, the preprocessor 1710-2, the training data selector 1710-3, the model trainer 1710-4, and the model evaluator 1710-5 may be included in the electronic apparatus 100, and the others may be included in the server 1600.

Also, at least one of the data obtainer 1710-1, the preprocessor 1710-2, the training data selector 1710-3, the model trainer 1710-4, or the model evaluator 1710-5 may be implemented as a software module. When at least one of the data obtainer 1710-1, the preprocessor 1710-2, the training data selector 1710-3, the model trainer 1710-4, or the model evaluator 1710-5 is implemented as a software module (or a program module including instructions), the software module may be stored in a non-transitory computer-readable recording medium. Also, in this case, at least one software module may be provided by an operating system (OS) or may be provided by a certain application. Alternatively, some of at least one software module may be provided by an operating system (OS), and the others may be provided by a certain application.

Figure 19:
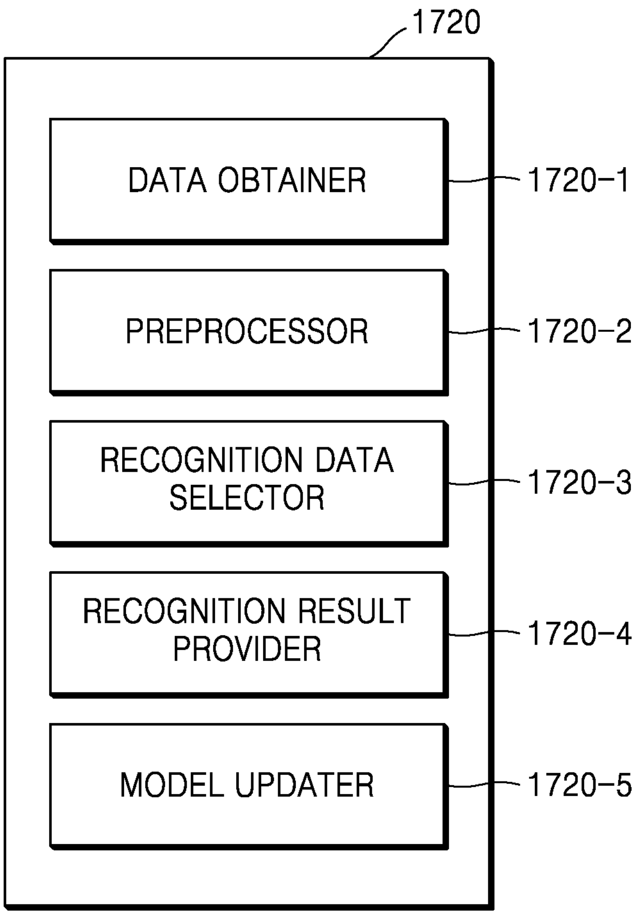
FIG. 19 is a block diagram of a data recognizer according to an embodiment of the disclosure.

FIG. 19 is a block diagram of the data recognizer 1720 according to some embodiments of the disclosure.

Referring to FIG. 19, the data recognizer 1720 according to some embodiments of the disclosure may include a data obtainer 1720-1, a preprocessor 1720-2, a recognition data selector 1720-3, a recognition result provider 1720-4, and a model updater 1720-5

The data obtainer 1720-1 may obtain data for at least one operation among determination of the target size of the environment data, selection of the sensor 400 to be turned off, selection of the environment data to be transmitted to the server 200, and determination of the threshold time, and the preprocessor 1720-2 may preprocess the obtained data such that the obtained data may be used for at least one operation among determination of the target size of the environment data, selection of the sensor 400 to be turned off, selection of the environment data to be transmitted to the server 200, and determination of the threshold time. The preprocessor 1720-2 may preprocess the obtained data into a preset format such that the recognition result provider 1720-4 described below may use the obtained data for at least one operation among determination of the target size of the environment data, selection of the sensor 400 to be turned off, selection of the environment data to be transmitted to the server 200, and determination of the threshold time.

The recognition data selector 1720-3 may select, from among the preprocessed data, data for at least one operation among determination of the target size of the environment data, selection of the sensor 400 to be turned off, selection of the environment data to be transmitted to the server 200, and determination of the threshold time. The selected data may be provided to the recognition result provider 1720-4. The recognition data selector 1720-3 may select some or all of the preprocessed data according to a preset criterion for at least one operation among determination of the target size of the environment data, selection of the sensor 400 to be turned off, selection of the environment data to be transmitted to the server 200, and determination of the threshold time. Also, the recognition data selector 1720-3 may select data according to a preset criterion based on training by the model trainer 1710-4.

The recognition result provider 1720-4 may apply the selected data to the data recognition model to perform at least one operation among determination of the target size of the environment data, selection of the sensor 400 to be turned off, selection of the environment data to be transmitted to the server 200, and determination of the threshold time. The recognition result provider 1720-4 may provide the recognition result according to the purpose of recognizing data. The recognition result provider 1720-4 may apply the selected data to the data recognition model by using the data selected by the recognition data selector 1720-3 as an input value. Also, the recognition result may be determined by the data recognition model.

The model updater 1720-5 may allow the data recognition model to be updated based on the evaluation of the recognition result provided by the recognition result provider 1720-4. For example, the model updater 1720-5 may allow the model trainer 1720-4 to update the data recognition model, by providing the model trainer 1710-4 with the recognition result provided by the recognition result provider 1720-4.

Moreover, at least one of the data obtainer 1720-1, the preprocessor 1720-2, the recognition data selector 1720-3, the recognition result provider 1720-4, or the model updater 1720-5 in the data recognizer 1720 may be manufactured in the form of at least one hardware chip and mounted on the electronic apparatus 100. For example, at least one of the data obtainer 1720-1, the preprocessor 1720-2, the recognition data selector 1720-3, the recognition result provider 1720-4, or the model updater 1720-5 may be manufactured in the form of a dedicated hardware chip for AI or may be manufactured as a portion of a general-purpose processor (e.g., a CPU or an application processor) or a graphic processor (e.g., a GPU) and mounted on the electronic apparatus 100.

Also, the data obtainer 1720-1, the preprocessor 1720-2, the recognition data selector 1720-3, the recognition result provider 1720-4, and the model updater 1720-5 may be mounted on one electronic apparatus 100 or may be respectively mounted on separate devices. For example, some of the data obtainer 1720-1, the preprocessor 1720-2, the recognition data selector 1720-3, the recognition result provider 1720-4, and the model updater 1720-5 may be included in the electronic apparatus 100, and the others may be included in the server 1600.

Also, at least one of the data obtainer 1720-1, the preprocessor 1720-2, the recognition data selector 1720-3 the recognition result provider 1720-4, or the model updater 1720-5 may be implemented as a software module. When at least one of the data obtainer 1720-1, the preprocessor 1720-2, the recognition data selector 1720-3, the recognition result provider 1720-4, or the model updater 1720-5 is implemented as a software module (or a program module including instructions), the software module may be stored in a non-transitory computer-readable recording medium. Also, in this case, at least one software module may be provided by an operating system (OS) or may be provided by a certain application. Alternatively, some of at least one software module may be provided by an operating system (OS), and the others may be provided by a certain application.

Figure 20:
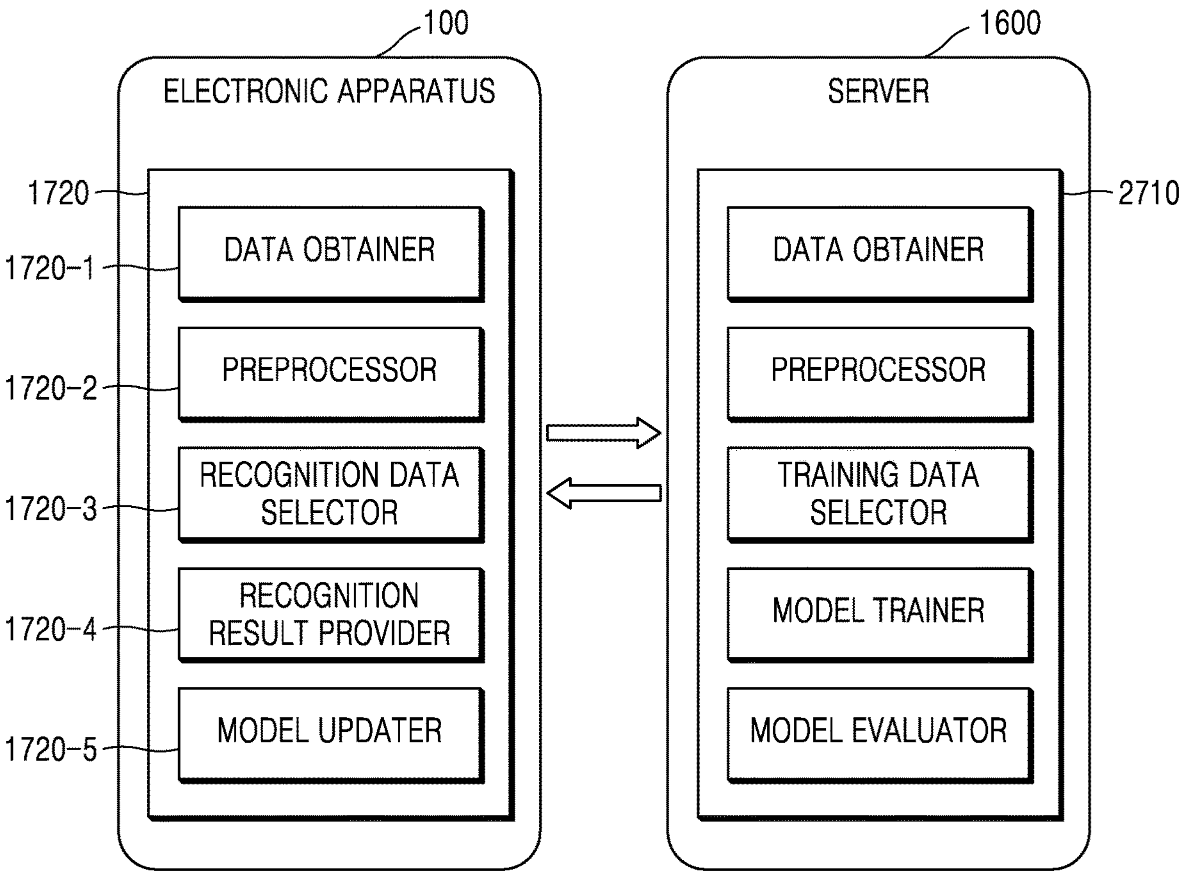
FIG. 20 is a diagram illustrating an example in which an electronic apparatus and a server learn and recognize data by interworking with each other, according to an embodiment of the disclosure.

FIG. 20 is a diagram illustrating an example in which the electronic apparatus 100 and the server 1600 learn and recognize data by interworking with each other, according to some embodiments of the disclosure.

Referring to FIG. 20, the server 1600 may learn a criterion for at least one operation among determination of the target size of the environment data, selection of the sensor 400 to be turned off, selection of the environment data to be transmitted to the server 200, and determination of the threshold time, and the electronic apparatus 100 may perform at least one operation among determination of the target size of the environment data, selection of the sensor 400 to be turned off, selection of the environment data to be transmitted to the server 200, and determination of the threshold time, based on the learning result by the server 1600.

In this case, a model trainer 2710 of the server 1600 may perform the function of the data learner 1710 illustrated in FIG. 18. The model trainer 2710 of the server 1600 may learn a criterion about which data to use to determine a certain situation and a criterion about how to perform at least one operation among determination of the target size of the environment data, selection of the sensor 400 to be turned off, selection of the environment data to be transmitted to the server 200, and determination of the threshold time, by using the data. By obtaining data to be used for training and applying the obtained data to the data recognition model, the model trainer 2710 may learn a criterion for at least one operation among determination of the target size of the environment data, selection of the sensor 400 to be turned off, selection of the environment data to be transmitted to the server 200, and determination of the threshold time.

Also, the recognition result provider 1720-4 of the electronic apparatus 100 may apply the data selected by the recognition data selector 1720-3 to the data recognition model generated by the server 1600 to perform at least one operation among determination of the target size of the environment data, selection of the sensor 400 to be turned off, selection of the environment data to be transmitted to the server 200, and determination of the threshold time. For example, the recognition result provider 1720-4 may transmit the data selected by the recognition data selector 1720-3 to the server 1600 and request the server 1600 to apply the data selected by the recognition data selector 1720-3 to the recognition model to perform at least one operation among determination of the target size of the environment data, selection of the sensor 400 to be turned off, selection of the environment data to be transmitted to the server 200, and determination of the threshold time. Also, the recognition result provider 1720-4 may receive, from the server 1600, result information of at least one operation among determination of the target size of the environment data, selection of the sensor 400 to be turned off, selection of the environment data to be transmitted to the server 200, and determination of the threshold time, which have been performed by the server 1600.

Alternatively, the recognition result provider 1720-4 of the electronic apparatus 100 may receive the recognition model generated by the server 1600 from the server 1600 and use the received recognition model to perform at least one operation among determination of the target size of the environment data, selection of the sensor 400 to be turned off, selection of the environment data to be transmitted to the server 200, and determination of the threshold time. In this case, the recognition result provider 1720-4 of the electronic apparatus 100 may apply the data selected by the recognition data selector 1720-3 to the data recognition model received from the server 1600 to perform at least one operation among determination of the target size of the environment data, selection of the sensor 400 to be turned off, selection of the environment data to be transmitted to the server 200, and determination of the threshold time.

Moreover, the embodiments of the disclosure described above may be written as a program that may be executed in a computer, and the written program may be stored in a medium.

The medium may be any one that may continuously store computer-executable programs or temporarily store them for execution or download. Also, the medium may be any recording unit or storage unit in the form of a single hardware unit or a combination of hardware units, but is not limited to a medium directly connected to a computer system and may be distributed on a network. Examples of the mediums may include magnetic recording mediums such as hard disks, floppy disks, and magnetic tapes, optical recording mediums such as CD-ROMs and DVDs, magneto-optical recording mediums such as floptical disks, and storage mediums such as ROMs, RAMs, and flash memories that are configured to store program instructions. Also, as another example of the mediums, recording mediums or storage mediums may be managed by app stores distributing applications or by sites or servers supplying or distributing various other software.

Although the disclosure has been described above in detail with reference to embodiments thereof, the disclosure is not limited to the above embodiments and various modifications and changes may be made therein by those of ordinary skill in the art without departing from the scope of the disclosure.

What is claimed is:

1. An electronic apparatus for controlling a function of a vehicle, comprising:
- a memory storing at least one instruction;
- communication circuitry having a communicative connection with an external server; and
- a processor operably coupled to the memory,
- wherein the at least one instruction is executable by the processor to cause the electronic apparatus to:
  - identify a state of the communicative connection with the external server,
  - determine a threshold time based on a speed of the vehicle and a risk of a position of the vehicle,
  - determine an analysis accuracy of the external server,
  - based on the identified state, determine a target size for data to be transmitted to the external server, wherein the target size is determined by:
    - determining whether an expected time regarding transmission of a candidate size is more than the threshold time,
    - when the expected time is less than the threshold time, setting the candidate size as the target size,
    - when the expected time is more than the threshold time, reducing the candidate size, and setting the reduced candidate size as the target size, and
    - when the expected time is less than the threshold time, and an expected time regarding transmission of an increased size from the candidate size is less than the threshold time, setting the increased size as the target size,
  - control at least one sensor of the vehicle to collect the data such that a total size of the collected data is less than or equal to the determined target size,
  - transmit the data collected by the at least one sensor and the determined analysis accuracy to the external server,
  - receive a control command corresponding to the analysis accuracy from the external server based on the transmitted data, and control a function of the vehicle according to the received control command, and
  - calculate a stability level of an autonomous operation of the vehicle based on the threshold time, and output the calculated stability level on an output device of the electronic apparatus, wherein the stability level associated with requiring less driver intervention is calculated when the threshold time is lower, wherein the expected time comprises a sum of a time for the at least one sensor to collect the data, a time for the data to be transmitted from the at least one sensor to the processor, a time for the processor to convert the data and transmit the data to the communication circuitry, a time for the communication circuitry to transmit the data to the external server through the communicative connection, a time for the external server to analyze the data and generate the control command according to the analysis accuracy, a time for the external server to transmit the control command to the communication circuitry through the communicative connection, a time for the control command to be transmitted from the communication circuitry to the processor, and a time for the electronic apparatus to control the function of the vehicle according to the control command, wherein the external server generates the control command using a neural network corresponding to the analysis accuracy among a plurality of neural networks, wherein a number of layers of a first neural network among the plurality of neural networks corresponding to a higher analysis accuracy is larger than a number of layers of a second neural network among the plurality of neural networks corresponding to a lower analysis accuracy, and wherein when a number of vehicles performing autonomous operation with the external server exceeds a predetermined number, the server transmits, to the electronic apparatus, a request for reducing a size of the data to be analyzed, wherein when the vehicle is moving forward, the electronic apparatus turns off a side lidar and a gyro sensor such that the total size of the collected data is less than or equal to the determined target size, and wherein when the vehicle is turning right, the electronic apparatus turns on the side lidar and the gyro sensor.

2. The electronic apparatus of claim 1, wherein the processor is further configured to cause the electronic apparatus to deactivate a portion of the at least one sensor to cause the total size of the collected data to be less than or equal to the determined target size.

3. The electronic apparatus of claim 2, wherein the vehicle includes a plurality of sensors, and wherein the processor is further configured to cause the electronic apparatus to select a particular sensor to be deactivated from among the plurality of sensors, based on at least one of a movement direction of the vehicle, or a position of the vehicle.

4. The electronic apparatus of claim 1, wherein the processor is further configured to cause the electronic apparatus to reduce a sensitivity of the at least one sensor to cause the total size of the collected data to be less than or equal to the determined target size.

5. The electronic apparatus of claim 1, wherein the threshold time is selected from among a plurality of candidate threshold times.

6. The electronic apparatus of claim 1, wherein the control command received from the external server includes instructions for autonomous operation of the vehicle, and wherein the processor is further configured to cause the electronic apparatus to calculate the stability level of the autonomous operation of the vehicle based on the target size and the threshold time.

7. The electronic apparatus of claim 1, wherein the processor is further configured to cause the electronic apparatus to:

obtain a navigational route for the vehicle from a departure location to a destination location;

divide the navigational route into sections; and calculate a plurality of predictive stability levels for autonomous operation of the vehicle for the sections.

8. The electronic apparatus of claim 7, wherein the processor is further configured to cause the electronic apparatus to:

obtain a plurality of potential navigational routes for the vehicle from a departure location to a destination location;

calculate a plurality of predictive stability levels for sections of each of the plurality of potential navigational routes;

calculate average predictive stability levels for each of the plurality of potential navigational routes, by averaging the plurality of predictive stability levels of sections of each of the plurality of potential navigational routes; and select a particular navigational route from among the plurality of potential navigational routes based on the particular navigational route having a highest average predictive stability level among the calculated average predictive stability levels.

9. The electronic apparatus of claim 1, wherein the processor is further configured to cause the electronic apparatus to:

select, from previously obtained data, a sub-portion of the previously obtained data having a total size less than or equal to the determined target size for transmission to the external server.

10. The electronic apparatus of claim 1, wherein controlling the at least one sensor of the vehicle to collect the data such that the total size of the collected data is less than or equal to the determined target size comprises selectively turning off the at least one sensor.

11. A method for an electronic apparatus for controlling a function of a vehicle, the method comprising:

identifying a state of a communication connection with an external server;

determining a threshold time based on a speed of the vehicle and a risk of a position of the vehicle;

determining an analysis accuracy of the external server;

based on the identified state, determining a target size for data to be transmitted to the external server, wherein the target size is determined by:

determining whether an expected time regarding transmission of a candidate size is more than the threshold time, when the expected time is less than the threshold time, setting the candidate size as the target size, when the expected time is more than the threshold time, reducing the candidate size, and setting the reduced size as the target size, and when the expected time is less than the threshold time, and an expected time regarding transmission of an increased size from the candidate size is less than the threshold time, setting the increased size as the target size, controlling at least one sensor of the vehicle to collect the data such that a total size of the collected data is less than or equal to the determined target size;

transmitting the data collected by the at least one sensor and the determined analysis accuracy to the external server;

receiving a control command corresponding to the analysis accuracy from the external server based on the transmitted data, and controlling a function of the vehicle according to the received control command; and calculating a stability level of an autonomous operation of the vehicle based on the threshold time and outputting the calculated stability level on an output device of the electronic apparatus, wherein the stability level associated with requiring less driver intervention is calculated when the threshold time is lower, wherein the expected time comprises a sum of a time for the at least one sensor to collect the data, a time for the data to be transmitted from the at least one sensor to a processor, a time for the processor to convert the data and transmit the data to communication circuitry, a time for the communication circuitry to transmit the data to the external server through the communication connection, a time for the external server to analyze the data and generate the control command according to the analysis accuracy, a time for the external server to transmit the control command to the communication circuitry through the communication connection, a time for the control command to be transmitted from the communication circuitry to the processor, and a time for the electronic apparatus to control the function of the vehicle according to the control command, wherein the external server generates the control command using a neural network corresponding to the analysis accuracy among a plurality of neural networks, wherein a number of layers of a first neural network among the plurality of neural networks corresponding to a higher analysis accuracy is larger than a number of layers of a second neural network among the plurality of neural networks corresponding to a lower analysis accuracy, and wherein when a number of vehicles performing autonomous operation with the external server exceeds a predetermined number, the server transmits, to the electronic apparatus, a request for reducing a size of the data to be analyzed, wherein when the vehicle is moving forward, the electronic apparatus turns off a side lidar and a gyro sensor such that the total size of the collected data is less than or equal to the determined target size, and wherein when the vehicle is turning right, the electronic apparatus turns on the side lidar and the gyro sensor.

12. The method of claim 11, further comprising:

deactivating a portion of the at least one sensor to cause the total size of the collected data to be less than or equal to the determined target size.

13. An electronic apparatus for controlling a function of a vehicle, the electronic apparatus comprising:

a memory storing at least one instruction;

communication circuitry having a communication connection with an external server; and a processor operably coupled to the memory, wherein at least one instruction is executable by the processor to cause the electronic apparatus to:

identify a state of the communication connection with the external server, determine a threshold time based on a speed of the vehicle and a risk of a position of the vehicle, determine an analysis accuracy of the external server, based on the identified state, determine a target size for data to be transmitted to the external server, wherein the target size is determined by:

determining whether an expected time regarding transmission of a candidate size is more than the threshold time, when the expected time is less than the threshold time, setting the candidate size as the target size, when the expected time is more than the threshold time, reducing the candidate size, and setting the reduced size as the target size, and when the expected time is less than the threshold time, and an expected time regarding transmission of an increased size from the candidate size is less than the threshold time, setting the increased size as the target size, select, from previously obtained data, a sub-portion of the previously obtained data having a total size less than or equal to the determined target size for transmission to the external server, transmit the selected sub-portion and the determined analysis accuracy to the external server, receive a control command corresponding to the analysis accuracy from the external server based on the transmitted data, and control a function of the vehicle according to the received control command, and calculate a stability level of an autonomous operation of the vehicle based on the threshold time, and output the calculated stability level on an output device of the electronic apparatus, wherein the stability level associated with requiring less driver intervention is calculated when the threshold time is lower, wherein the expected time comprises a sum of a time for at least one sensor to collect the data, a time for the data to be transmitted from the at least one sensor to the processor, a time for the processor to convert the data and transmit the data to the communication circuitry, a time for the communication circuitry to transmit the data to the external server through the communication connection, a time for the external server to analyze the data and generate the control command according to the analysis accuracy, a time for the external server to transmit the control command to the communication circuitry through the communication connection, a time for the control command to be transmitted from the communication circuitry to the processor, and a time for the electronic apparatus to control the function of the vehicle according to the control command, wherein the external server generates the control command using a neural network corresponding to the analysis accuracy among a plurality of neural networks, wherein a number of layers of a first neural network among the plurality of neural networks corresponding to a higher analysis accuracy is larger than a number of layers of a second neural network among the plurality of neural networks corresponding to a lower analysis accuracy, and wherein when a number of vehicles performing autonomous operation with the external server exceeds a predetermined number, the server transmits, to the electronic apparatus, a request for reducing a size of the data to be analyzed, wherein when the vehicle is moving forward, data of a side lidar and data of a gyro sensor are not selected for transmission to the external server, and wherein when the vehicle is turning right, the data of the side lidar and the data of the gyro sensor are selected for transmission to the external server.

* * * * *